US006519548B1

(12) United States Patent
Kuroda et al.

(10) Patent No.: US 6,519,548 B1
(45) Date of Patent: Feb. 11, 2003

(54) INFORMATION PROCESSING DEVICE FOR DIVER

(75) Inventors: Masao Kuroda, Shiojiri (JP); Hitomi Aizawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/831,181

(22) PCT Filed: Sep. 6, 2000

(86) PCT No.: PCT/JP00/06074

§ 371 (c)(1), (2), (4) Date: May 3, 2001

(87) PCT Pub. No.: WO01/18488

PCT Pub. Date: Mar. 15, 2001

(30) Foreign Application Priority Data

Sep. 8, 1999 (JP) .......................................... 11-254503

(51) Int. Cl.$^{7}$ ................................................ G06F 15/42

(52) U.S. Cl. .......................... 702/139; 368/10; 368/11; 128/201.27

(58) Field of Search .............................. 368/11, 223, 9, 368/10; 128/201.27, 202.22; 364/413.31, 561, 558; 702/139, 138, 137

(56) References Cited

U.S. PATENT DOCUMENTS 3,992,948 A 11/1976 D'Antonio et al. ....... 73/432 R
4,783,772 A * 11/1988 Umemoto et al. ............ 368/11
4,835,716 A 5/1989 Tamaki et al. .............. 364/558
5,499,179 A * 3/1996 Sato ...................... 128/201.27

FOREIGN PATENT DOCUMENTS

| | | |
|---|---|---|
| JP | 58-193466 | 11/1983 |
| JP | 62-215889 | 9/1987 |
| JP | 63-174093 | 11/1988 |
| JP | 3-264813 | 11/1991 |
| JP | 10-250683 | 9/1998 |
| JP | 11-84030 | 3/1999 |

* cited by examiner

*Primary Examiner*—Don Wong
*Assistant Examiner*—Tuyet T. Vo
(74) *Attorney, Agent, or Firm*—Michael T. Gabrik

(57) ABSTRACT

Provided is a diver's information processing device for notifying a diver of a change in a pressure decrease ratio, at which pressure decreases during surfacing, for the purpose of minimizing the risk of a diver's decompression sickness and excess pulmonary expansion. In particular, when diving is performed at a high altitude, notification is made so that a pressure decrease ratio will be held lower than a pressure decrease ratio permitted at a low altitude. A diver's information processing device 1 includes means that uses a pressure meter 61 and a timer 68 to calculate a pressure decrease ratio. Moreover, the diver's information processing device 1 includes means that uses an acoustic notifier 37, a vibration generator 38, and a display panel 11 to continuously notify a pressure decrease ratio, at which pressure applied to a diver decreases during surfacing, for the purpose of minimizing the dangers of diver's surfacing.

18 Claims, 13 Drawing Sheets

ST4

INFORMATION PROCESSING DEVICE FOR DIVER

TECHNICAL FIELD

The present invention relates to a diver's information processing device. More particularly, the present invention is concerned with a technology for notifying a diver of a pressure decrease ratio at which pressure applied to a diver decreases during surfacing over diving for the purpose of minimizing the risk of the diver's decompression sickness or excess pulmonary expansion at a high altitude at which a pressure change rate tends to increase.

BACKGROUND ART

A diver's information processing device may be referred to as a so-called dive computer. A method of calculating the conditions for decompression after diving that is adapted to the diver's information processing device is described in "Dive Computers—A Consumer's Guide to History, Theory & Performance" (Watersport Publishing Inc., 1991) written by Ken Loyst et al. Moreover, discussions have been made on a calculating method described in a theoretical literature "Decompression—Decompression Sickness" (Springer, Berlin, 1984, pp.14) written by A. A. Buhlmann.

Based on the theory, the diver's information processing device calculates an amount of inert gas absorbed into a body and an amount of inert gas discharged therefrom during and after diving so as to grasp an amount of intracorporeal inert gas all the time. The diver's information processing device is thus designed to minimize the risk of a diver's decompression sickness.

Moreover, if a surfacing speed is too high, nitrogen or any other inert gas having permeated into a body becomes bubbles to cause decompression sickness. From a viewpoint of averting decompression sickness, it is important to observe a specific surfacing speed at which a diver should come up to the surface. In some conventional diver's information processing devices, the surfacing speed is monitored. If a current surfacing speed is faster than the pre-set upper limit of a surfacing speed, a warning indicating that a specified surfacing speed is violated is generated to inform the diver of the fact.

Moreover, the surfacing speed may not be related to a change in hydraulic pressure occurring during surfacing. Specifically, in some diver's information processing devices, a variation of a ratio of hydraulic pressure detected before surfacing to hydraulic pressure detected after surfacing, which is detected during a unit time, is taken into account. The upper limit of a surfacing speed is determined in association with each depth of water, and the surfacing speed is monitored.

However, these devices have a drawback that no consideration is taken into an atmospheric pressure on water in which diving is performed. A case where diving is performed at a high altitude at which the atmospheric pressure on water is low is compared with a case where diving is performed at a low altitude at which the atmospheric pressure on water is high. Consequently, it is revealed that even if a diver surfaces by the same distance at the same time instant in the water that exhibits the same concentration, a pressure change rate is smaller when diving is performed at the high altitude. Herein, the pressure change rate is a quotient of a pressure detected after the end of travel by a pressure detected before the start of the travel. However, the air in the lungs is inversely proportional to the pressure change rate, and is likely to expand more greatly than it is when diving is performed at the low altitude. When diving is performed at the high altitude, the risk of a diver's decompression sickness or excess pulmonary expansion increases.

Nevertheless, although some diver's information processing devices have the upper limit of a surfacing speed, at which surfacing is performed, set in association with a depth of water, many diver's information processing devices have the upper limit of a surfacing speed set to a fixed value. No consideration is taken into the atmospheric pressure on water. From a viewpoint of putting emphasis on safety, the upper limit of a surfacing speed cannot help being set to a considerably small value. As a result, when diving is performed at a high altitude at which an atmospheric pressure on water is low, a warning indicating that a specified surfacing speed is violated is generated frequently, though the surfacing speed is tolerable. Therefore, information that does not match the current situation is provided. In contrast, when the upper limit of a surfacing speed is set to a large value in order to prevent incorrect generation of a warning, it is hard to reliably avert decompression sickness.

In consideration of the foregoing drawbacks, an object of the present invention is to provide a diver's information processing device capable of setting the upper limit of a pressure decrease ratio, at which pressure decreases during surfacing, according to an atmospheric pressure on water in which diving is performed, and properly monitoring a surfacing speed during diving performed even at a high altitude at which the atmospheric pressure on water is low.

DISCLOSURE OF INVENTION

For accomplishing the above object, according to one aspect of the present invention, a diver's information processing device comprises a pressure metering means, a diving time measuring means, a pressure decrease ratio calculating means, an upper limit-of-pressure decrease ratio setting means, and a pressure decrease ratio comparing means. The diving time measuring means measures a diving time. The pressure decrease ratio calculating means calculates a pressure decrease ratio, at which pressure decreases during surfacing, according to the pressure measured by the pressure metering means and the diving time measured by the diving time measuring means. The upper limit-of-pressure decrease ratio setting means sets the upper limit of a pressure decrease ratio. The pressure decrease ratio comparing means compares the upper limit of a pressure decrease ratio set by the upper limit-of-pressure decrease ratio setting means with the current pressure decrease ratio calculated by the pressure decrease ratio calculating means. The upper limit-of-pressure decrease ratio setting means sets the upper limit of a pressure decrease ratio, at which pressure decreases during surfacing within diving, according to information of an atmospheric pressure on water in which diving is performed.

According to the present invention, for monitoring whether a pressure decrease ratio at which pressure decreases during surfacing over diving is appropriate, the upper limit of a pressure decrease ratio is set to a predetermined value associated with an atmospheric pressure on water. What is referred to as the pressure decrease ratio is a quotient of a difference between a current absolute pressure and an absolute pressure detected t sec (min) earlier by a time t. The pressure decrease ratio is compared with the upper limit of a pressure decrease ratio that is associated with a current atmospheric pressure on water. For example, the upper limit of a pressure decrease ratio is set to a small value for diving performed at a high altitude at which the atmospheric pressure on water is low. This is because a change in absolute pressure, which is applied to a diver during surface per unit time is larger when diving is performed at a high altitude, at which the atmospheric pressure on water is low, than when diving is performed at a low altitude at which the atmospheric pressure on water is high. A variation per unit time of a ratio of an absolute pressure detected before start of surfacing to an absolute pressure detected thereafter has a more significant meaning than a decrease ratio at which a hydraulic pressure decreases during surfacing over diving. In Japanese Unexamined Patent Publication No. 10-250683, the upper limit of a surfacing speed is determined based on the current depth of water. Moreover, since the variation of the ratio of the absolute pressures detected before and after surfacing is taken into account, a mere surfacing speed is not employed but a pressure is adopted in order to monitor safety during surfacing. This is because the concentration of water is different from place to place, for example, the concentration of fresh water is different from that of seawater. Therefore, even when the surfacing speed is set to the same value, a change in pressure differs with the difference in the concentration of water. According to the present invention, the upper limit of a pressure decrease ratio is determined so that a relatively high pressure decrease ratio will be permitted during diving performed at a low altitude at which the atmospheric pressure on water is high, and only a relatively low pressure decrease ratio will be permitted during diving performed at a high altitude at which the atmospheric pressure on water is low. This makes it possible to properly judge safety during surfacing.

A pressure decrease ratio inferring means can be employed to infer a pressure decrease ratio from the rate of change of a pressure decrease ratio currently calculated by the pressure decrease ratio calculating means from a pressure decrease ratio previously calculated thereby.

When a diver surfaces rapidly during diving, the risk of the diver's decompression sickness increases. Moreover, rapid surfacing releases pressure from the diver. This causes the air in the lungs to expand, and brings about a risk that the lungs may rupture. For averting this incident, since it is dangerous to give a warning when a surfacing speed comes to a dangerous level, notification must be performed before the surfacing speed rises to the dangerous level. For this purpose, the rate of change in the pressure decrease ratio must be checked, and a surfacing speed must be inferred from the change rate before the current surfacing speed rises to the dangerous level. By thus inferring a surfacing speed before a current surfacing speed rises to a dangerous level, greater safety can be guaranteed for a diver.

Preferably, the pressure decrease ratio inferring means infers a pressure decrease ratio from a rate of change of a currently calculated pressure decrease ratio from a previously calculated pressure decrease ratio until diving is completed. More preferably, during surfacing, a pressure decrease ratio in several seconds can be inferred sequentially.

Preferably, the upper limit-of-pressure decrease ratio setting means sets the upper limit of a pressure decrease ratio, at which pressure decreases during surfacing over diving, according to a pressure measured by the pressure metering means and a pre-set pressure change rate.

Herein, what is referred to as a pressure change rate is a quotient of an absolute pressure predicted in t seconds (minutes) by a current absolute pressure. Using the pressure change rate, the upper limit of a pressure decrease ratio can be determined based on the current pressure alone. This obviates the necessity of determining the upper limit of a pressure decrease ratio according to information of an atmospheric pressure on water or a current depth of water. Consequently, the number of processing steps decreases.

A pressure decrease ratio notifying means can be used to notify the diver of a current pressure decrease ratio. Otherwise, when it is judged from comparison of a current pressure decrease ratio with the upper limit of a pressure decrease ratio that the current pressure decrease ratio is larger than the upper limit, the pressure decrease ratio notifying means gives a warning.

When the pressure decrease ratio continuously exceeds a notification level, the notifying means given a warning. This makes it possible to sensuously grasp whether a pressure decrease ratio currently tends to increase or decrease. Before the pressure decrease ratio reaches a dangerous level, danger can be readily reported to a diver.

A pressure decrease ratio may be reported by continuously varying the notification level that is indicated with an alarm sound of a varying frequency. A continuous change in the pressure decrease ratio may thus be expressed. It can be sensuously grasped whether the pressure decrease ratio currently tends to increase or decrease. Before the pressure decrease ratio reaches a dangerous level, danger can be readily reported to a diver. Moreover, in particular, when the pressure decrease ratio approaches to the dangerous level, if the frequency of the alarm sound increases, a diver can intuitively recognize an impending danger.

Moreover, since a notification level is continuously varied and indicated with an alarm sound of a varying tempo in order to tell a current pressure decrease ratio, a continuous change in the pressure decrease ratio can be expressed. Consequently, a diver can intuitively grasp whether the pressure decrease ratio currently tends to increase or decrease. Before the pressure decrease ratio reaches a dangerous level, danger can be readily communicated to a diver. Moreover, if the tempo of the alarm sound increases when the pressure decrease ratio approaches the dangerous level, similarly to a case that his/her heart rate increases when a human being is in danger, a diver can intuitively recognize that he/she is in danger.

Furthermore, when the notification level is continuously varied and indicated with an alarm sound of a varying tempo in order to notify a diver of a current pressure decrease ratio, a continuous change in the pressure decrease ratio can be expressed. Consequently, a diver can intuitively grasp whether the pressure decrease ratio currently tends to increase or decrease. Before the pressure decrease ratio reaches a dangerous level, danger can be readily told to a diver. Moreover, when the pressure decrease ratio approaches the dangerous level, if the volume of the alarm sound increases, a diver will more seriously recognize that he/she is in danger. This would be effective in attracting a diver's attention.

Moreover, the notification level may be continuously varied and indicated with a vibratory alarm of a varying amplitude or tempo. When the vibratory alarm is used in this way, unlike when the alarm sound is adopted, a diver will not confound with a warning given to himself/herself and a warning given to any other diver. The diver can therefore recognize in an earlier stage that information of a pressure decrease ratio is addressed to himself/herself. This would be effective in preventing the pressure decrease ratio from reaching a dangerous level. Moreover, if the tempo of the vibratory alarm increases when the pressure decrease ratio approaches the dangerous level, similarly to a case that his/her heart rate increases when a human being is in danger, a diver can intuitively recognize that he/she is in danger.

An upper limit-of-pressure decrease ratio indicating means can be employed to indicate a tolerance of a pressure decrease ratio to the upper limit of a pressure decrease ratio. The employment of a display unit for visual recognition is an effective means for notifying a diver of danger implied with the pressure decrease ratio. When the display unit and notifying means described in claim 1 to claim 5 are used in combination, danger can be more readily told to a diver.

Any of the above combinations will do as long as danger is notified and reported to a diver in an easy-to-understand manner.

BEST MODE FOR CARRYING OUT THE INVENTION

An example of the present invention will be described in conjunction with the drawings below.

[Overall configuration]

Figure 1:
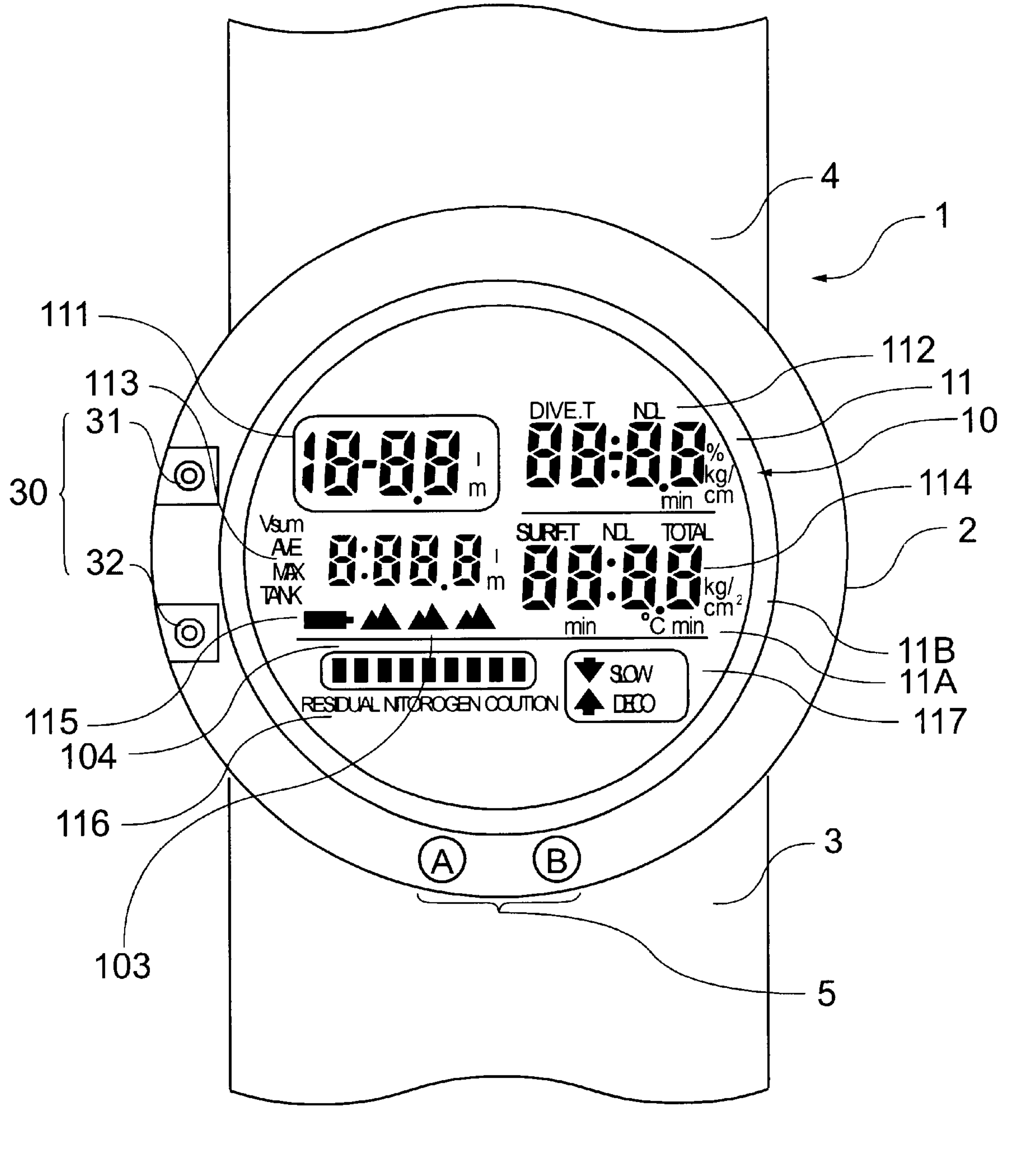
FIG. 1 is a plan view showing a main unit of a diver's information processing device to which the present invention is adapted, and a part of a wristband thereof.
Figure 2:
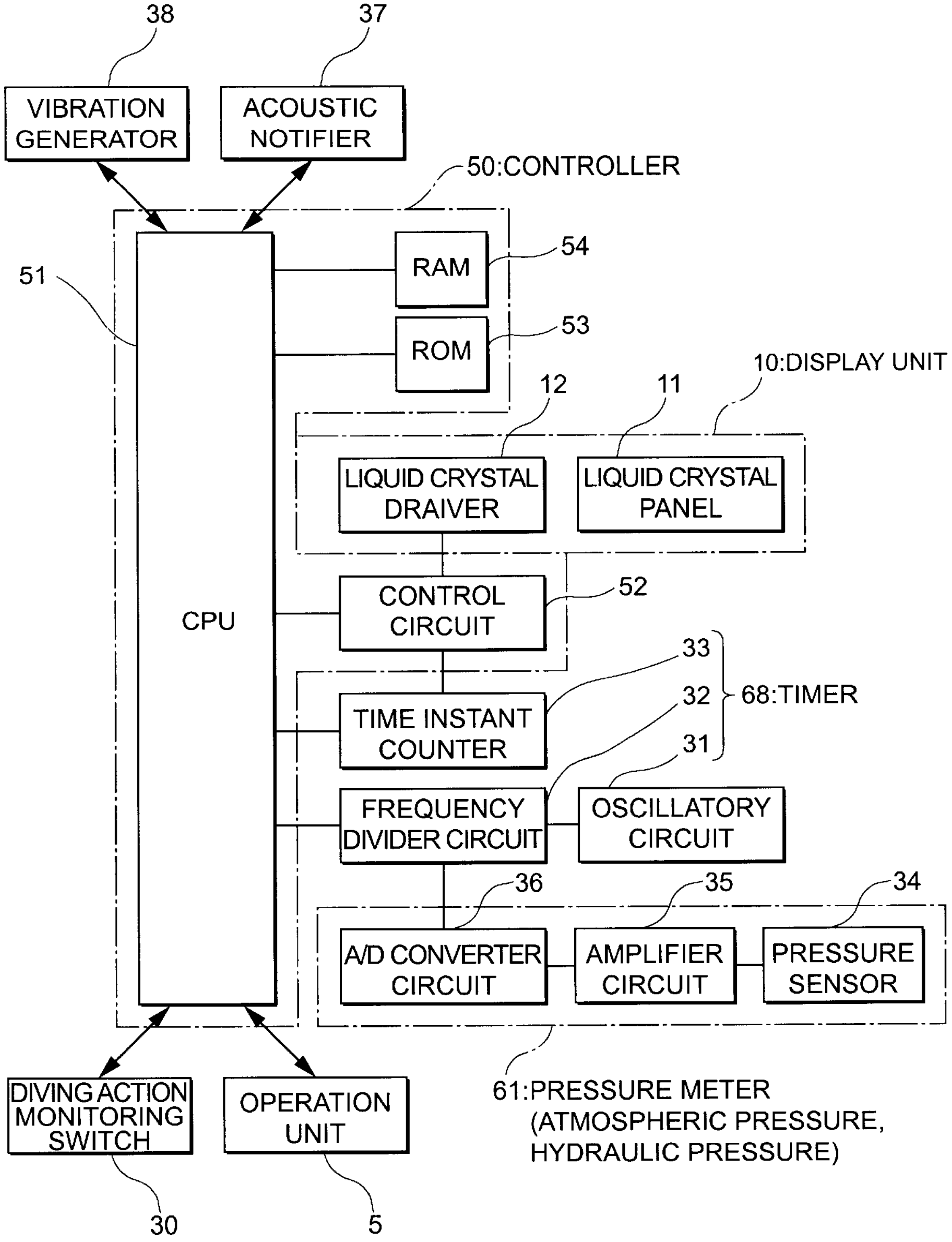
FIG. 2 is an overall block diagram showing the diver's information processing device to which the present invention is adapted.

FIG. 1 is a plan view showing a main unit of a diver's information processing device of the present example, and a part of a wristband thereof. FIG. 2 is a block diagram of the main unit.

In FIG. 1, an information processing device 1 of the present example is referred to as a so-called dive computer, and designed to calculate and indicate a depth of water at which a diver is diving and a diving time. Moreover, the information processing device 1 measures an amount of inert gas (mainly nitrogen) accumulated in a body during diving, and indicates the time, which is required for discharging accumulated nitrogen on the land after diving, according to the result of measurement.

The information processing device 1 has wristbands 3 and 4 coupled to one side of a round main unit 2 that is comparable to the side of a mark of 6 of a wristwatch, and the other side thereof that is comparable to the side of a mark of 12 of the wristwatch. Owing to the wristbands 3 and 4, the main unit can be worn on a diver's wrist in the same manner as a wristwatch is. The main unit 2 has an upper case and a lower case fixed to each other using screws or the like and is fully sealed in a watertight manner. A printed-circuit board (not shown) on which various kinds of electronic parts are mounted is stored in the main unit 2.

A display unit 10 including a liquid crystal display panel 11 is placed on the top of the main unit 2. Two pushbutton switches A and B are formed at a position comparable to the position of a mark of 6 on a wristwatch. The switches A and B constitute an operation unit 5 used to select any mode or switch modes in which the information processing device 1 is operated.

A diving action switch 30 realized with a moisture sensor and used to monitor whether diving is started is formed at a position on the top of the main unit 2 comparable to the position of a mark of 9 on a wristwatch. The diving action monitor switch 30 has two electrodes 31 and 32 exposed on the top of the main unit. The electrodes 31 and 32 conduct electricity to each other due to seawater or the like. When a resistance between the electrodes 31 and 32 decreases, it is judged that diving has been started. However, the diving action monitor switch 30 is used merely to detect that a diver has plunged into the water so as to enter a diving mode. The diving action monitor switch 30 is not designed to detect whether one diving action has started. In other words, the wrist on which the information processing device 1 is worn may be merely immersed in the sea. In this case, it should not be judged that diving has started. In the information processing device 1 of the present example, when a pressure sensor incorporated in the main unit detects that a depth of water (hydraulic pressure) becomes equal to or larger than a certain value, for example, in the present example, 1.5 m, it is judged that diving has started. When the depth of water becomes smaller than the value, it is judged that diving has been completed.

As shown in FIG. 2, in the information processing device 1 of the present example, the display unit 10 consists mainly of the liquid crystal display panel 11, a liquid crystal driver 12, and a controller 50. Various kinds of information are presented on the liquid crystal display panel 11. The liquid crystal driver 12 drives the liquid crystal display panel 11. The controller 50 performs processing in each mode and presents information associated with each mode on the liquid crystal display panel 11. Outputs of the switches A and B and an output of the diving action monitor switch 30 realized with a moisture sensor are fed to the controller 50.

The diver's information processing device 1 detects a normal time instant and monitors a diving time. Clock pulses output from an oscillatory circuit 31 are fed to the controller 50 via a frequency divider circuit 32. A time instant counter 33 counts the clock pulses in units of one sec. The oscillatory circuit 31, frequency divider circuit 32, and time instant counter 33 constitute a timer 68.

Moreover, the diver's information processing device 1 measures and indicates a depth of water, and measures an amount of nitrogen gas (inert gas) accumulated in a body according to the depth of water (hydraulic pressure) and diving time. Therefore, a pressure meter 61 is composed of a pressure sensor 34 (semiconductor pressure sensor), an amplifier circuit 35, and an A/D converter circuit 36. The amplifier circuit 35 amplifies an output signal of the pressure sensor 34. The A/D converter circuit 36 converts an analog signal output from the amplifier circuit 35 into a digital signal, and outputs the digital signal to the controller 50. Furthermore, a notifier 37 and a vibration generator 38 are included in the information processing device 1, whereby a warning can be told to a diver in the form of an alarm sound or vibrations. The pressure meter may use only one sensor to measure both a depth of water and an atmospheric pressure, or may use different sensors to measure the depth of water and atmospheric pressure respectively.

In the present example, the controller 50 consists mainly of a CPU 51 responsible for the control of the whole device, and a control circuit 52 for controlling the liquid crystal driver 12 and time instant counter 33 under the control of the CPU 51. Each mode to be described later is implemented with each processing the CPU 51 performs based on a program stored in a ROM 53.

The diver's information processing device 1 is designed to monitor a pressure decrease ratio, at which pressure applied to a diver decreases, in a diving mode that will be described later. This ability of the diver's information processing device 1 is realized with facilities, which are described below, by utilizing the capabilities of the CPU 51, ROM 53, and RAM 54.

Figure 3:
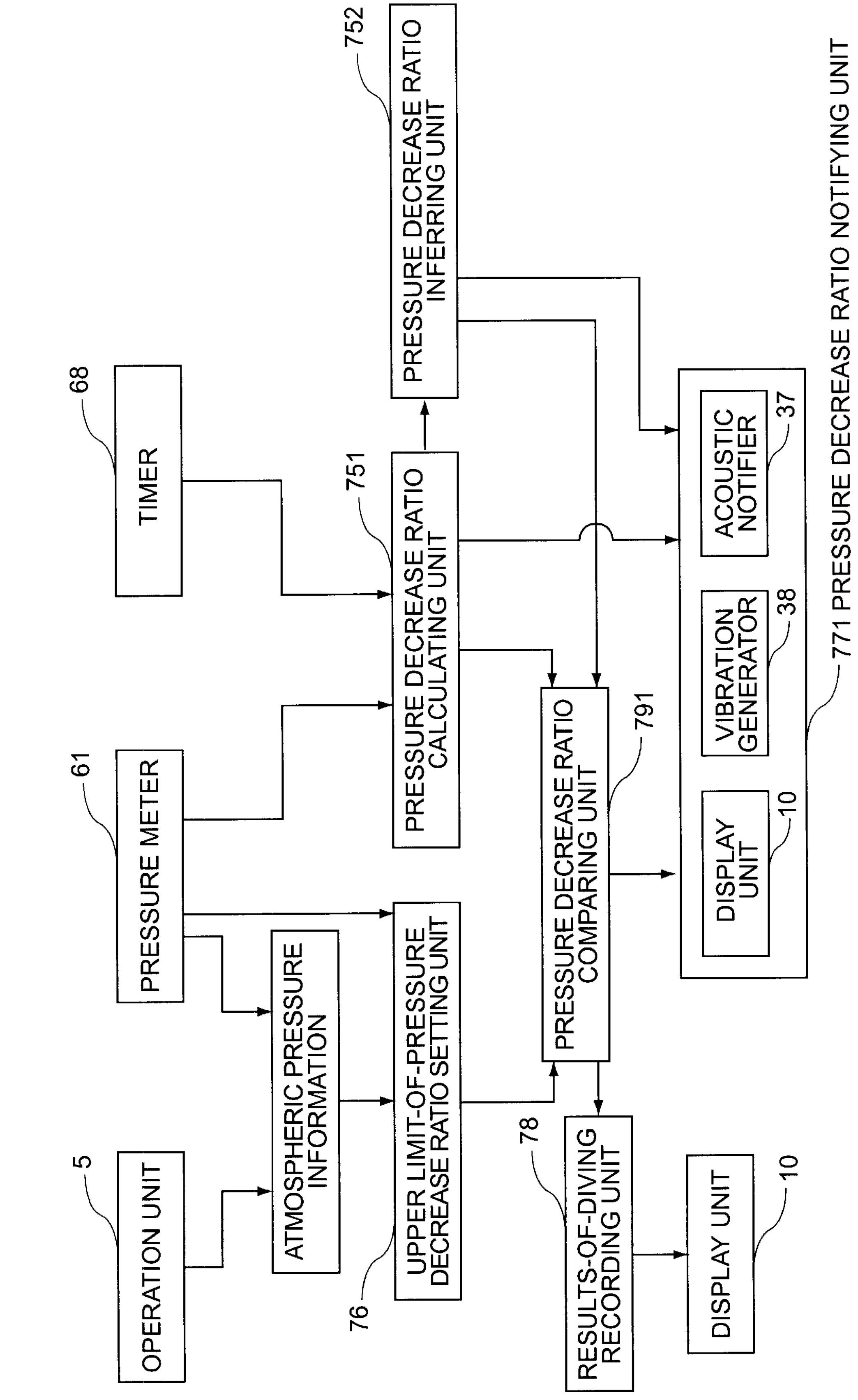
FIG. 3 is a block diagram showing components required for giving a warning against violation of a specified pressure decrease ratio in the diver's information processing device to which the present invention is adapted.

Specifically, as shown in FIG. 3, in the diver's information processing device 1, the facilities include a pressure decrease ratio calculating unit 751, a pressure decrease ratio comparing unit 791, a pressure decrease ratio inferring unit 752, and a pressure decrease ratio notifying unit 771. The pressure decrease ratio calculating unit 751 calculates a pressure decrease ratio, at which pressure decreases during surfacing, using a result of timekeeping performed by the timer 68 and a result of measurement performed by the pressure meter 61. The pressure decrease ratio comparing unit 791 compares the upper limit of a pressure decrease ratio determined by an upper limit-of-pressure decrease ratio setting unit 76 with a pressure decrease ratio calculated by the pressure decrease ratio calculating unit 751 according to the information of an atmospheric pressure on water measured by the pressure meter 61 before the start of diving or the information of the atmospheric pressure on water entered at the operation unit 5 before the start of diving. The pressure decrease ratio inferring unit 752 calculates a difference between a pressure decrease ratio calculated previously by the pressure decrease ratio calculating unit 751 and a pressure decrease ratio calculated currently. The pressure decrease ratio inferring unit 752 then divides the previous pressure decrease ratio by the current pressure decrease ratio to work out a pressure decrease ratio change rate. The pressure decrease ratio inferring unit 752 then infers a pressure decrease ratio predicted in several seconds from the pressure decrease ratio change rate. When the current pressure decrease ratio or the pressure decrease ratio predicted in several seconds is larger than the upper limit of a pressure decrease ratio, the pressure decrease ratio notifying unit 771 gives a warning indicating violation of a specified pressure decrease ratio. Moreover, the pressure decrease ratio notifying unit 771 directly notifies the current pressure decrease ratio or the pressure decrease ratio predicted in several seconds, or notifies a ratio of the current pressure decrease ratio or the pressure decrease ratio predicted in several seconds to the upper limit of a pressure decrease ratio. Herein, the pressure decrease ratio may be converted into a surfacing speed in consideration of the concentration of seawater or fresh water for a diver's better understanding. Moreover, the upper limit-of-pressure decrease ratio setting unit 76 may set the upper limit of a pressure decrease ratio using a pressure change rate calculated from a current pressure. The pressure decrease ratio calculating unit 751 is realized as an arithmetic facility by utilizing the CPU 51, ROM 53, and RAM 54 shown in FIG. 2. The pressure decrease ratio notifying unit 771 is realized as an indicating facility by utilizing the CPU 51, ROM 53, RAM 54, notifier 37, and vibration generator 38, and liquid crystal panel 11.

In the present example, the comparing unit 791 compares the upper limit of a pressure decrease ratio, which is associated with each range of atmospheric pressures on the surface, stored in the ROM 53, and set by the upper limit-of-pressure decrease ratio setting unit 76, with a current pressure decrease ratio. When the current pressure decrease ratio is larger than the upper limit of a pressure decrease ratio associated with the current atmospheric pressure on water, the pressure decrease ratio notifying unit 771 gives a warning indicating violation of a specified pressure decrease ratio. Specifically, a warning may be indicated on the liquid crystal display panel 11, an alarm sound may be generated by the acoustic notifier 37, or vibrations generated by the vibration generator 38 are propagated to a diver. When the current pressure decrease ratio becomes smaller than the upper limit of a pressure decrease ratio, the warning indicating violation of the specified pressure decrease ratio is stopped.

Moreover, in the present example, the pressure decrease ratio notifying unit 771 communicates the information of a pressure decrease ratio, which is calculated by the pressure decrease ratio calculating unit 751, by raising the frequency of an alarm sound, which is generated by the acoustic notifier 37, with an increase in the pressure decrease ratio. Instead of changing the frequency of an alarm sound, the tempo of the alarm sound or the volume thereof may be varied. Moreover, the pressure decrease ratio notifying unit 771 may use the vibration generator 38 to notify a varying pressure decrease ratio by increasing or decreasing the amplitude of vibrations or the tempo thereof. Moreover, the pressure decrease ratio notifying unit 771 may use the display panel 11 to indicate a result of calculation of a tolerance of a current pressure decrease ratio to the upper limit of a pressure decrease ratio. Herein, the tolerance is calculated using a pressure decrease ratio calculated by the pressure decrease ratio calculating unit 751 and the upper limit of a pressure decrease ratio set by the upper limit-of-pressure decrease ratio setting unit 76. As a way of indicating the tolerance, graphical indication like the one using a bar graph 118 shown in FIG. 1 is recommended.

Furthermore, the pressure decrease ratio notifying unit 771 may be realized using the acoustic notifier 37, vibration generator 38, and display panel 11 in combination.

Moreover, the diver's information processing device 1 includes a results-of-diving recording unit 78 that stores and preserves in the RAM 54 the results of diving (a date of diving, a diving time, a maximum depth of water, and other various data). Herein, the results of diving are concerned with one diving action that is thought to start when a depth of water measured by the pressure meter 61 becomes larger than 1.5 m (value used to judge whether diving has started) and end when the depth of water becomes smaller than 1.5 (value used to judge whether diving has been completed). The results-of-diving recording unit 78 is realized as a facility using the capabilities of the CPU 51, ROM 53, and RAMG 54 shown in FIG. 2. Herein, when the pressure decrease ratio notifying unit 771 gives a plurality of successive warnings, for example, two or more successive warnings, during one diving action, the results-of-diving recording unit 78 records as a result of diving violation of a specified pressure decrease ratio. When the results of previous diving are reproduced and indicated in a log mode to be described later, the fact that the specified pressure decrease ratio has been violated during diving is also reproduced and indicated. Moreover, the results-of-diving recording unit 78 measures a diving time according to the result of timekeeping performed by the timer 68 during a period from the instant the depth of water calculated by the pressure meter 61 becomes larger than 1.5 m (value used to judge whether diving has started) to the instant the depth of water becomes smaller than 1.5 m (value used to judge whether diving has been completed). If the diving time is less than 3 minutes, the diving is not treated as one diving action. The results of diving acquired during the diving time are not recorded. The results-of-diving recording unit 78 records and preserves up to ten data sets of the results of diving as log data. If the diving time is longer than 3 min, old data is deleted in order of length of a period during which data is preserved. If the results of diving performed for a short period of time, such as, skin diving are recorded, the results of important diving may be deleted.

[Description of a notifying sound generation circuit]

Figure 11:
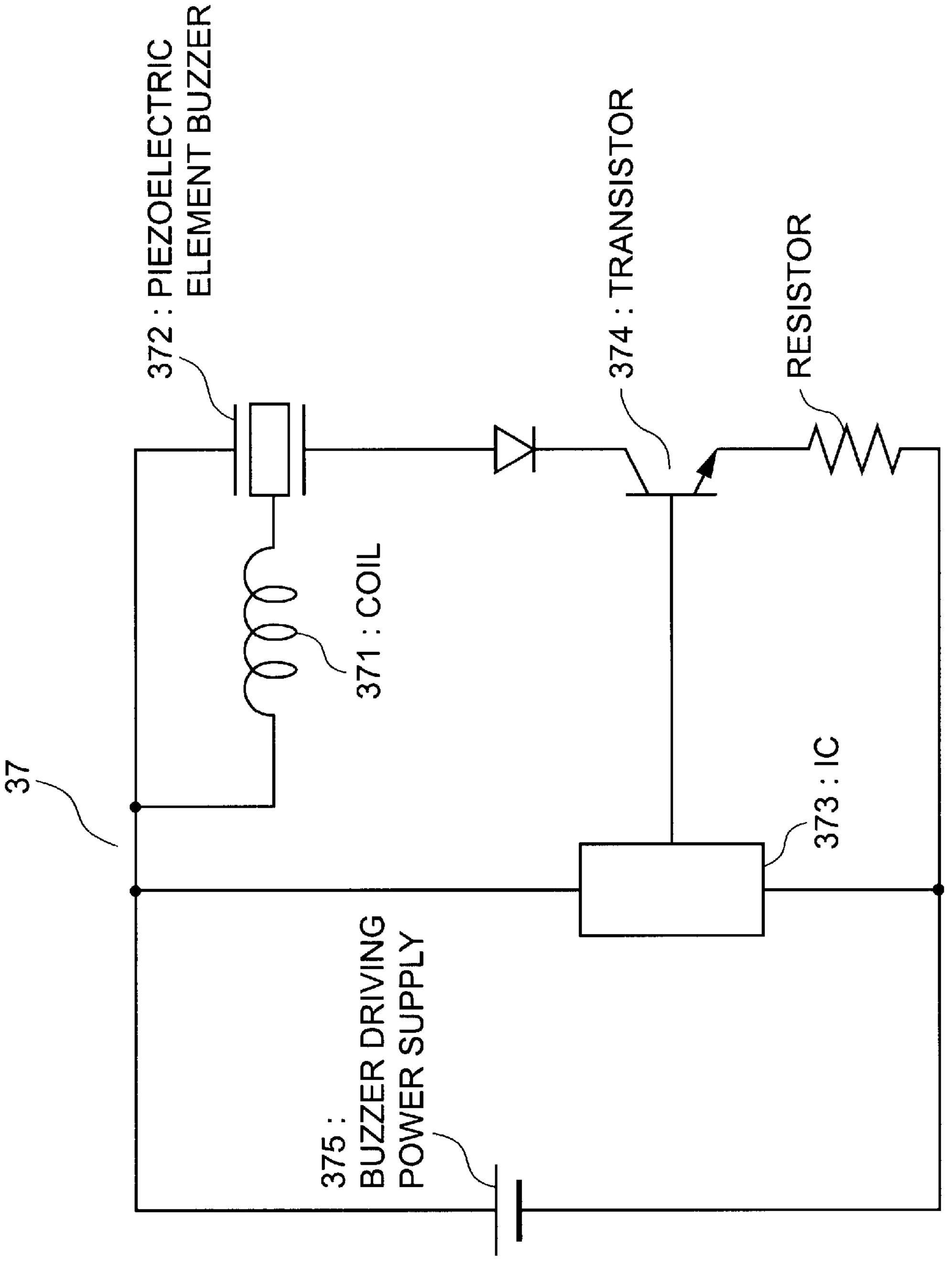
FIG. 11 is an explanatory diagram concerning an acoustic notifier.

A notifying sound generation circuit will be described in conjunction with FIG. 11. As shown in FIG. 11, the notifying sound generation circuit consists of a booster coil 371, a piezoelectric element buzzer 372, an IC 373, a transistor 374, and a buzzer driving power supply 375. Electricity is supplied from the buzzer driving power supply 375 to the booster coil 371. The booster coil 371 in turn boosts the electricity. Consequently, an alternating voltage is applied to the piezoelectric element buzzer 372. Eventually, a notifying sound (alarm sound) is generated.

[Description of the vibration generator]

Next, the vibration generator will be described in conjunction with FIG. 12, FIG. 13, and FIG. 14.

Figure 12:
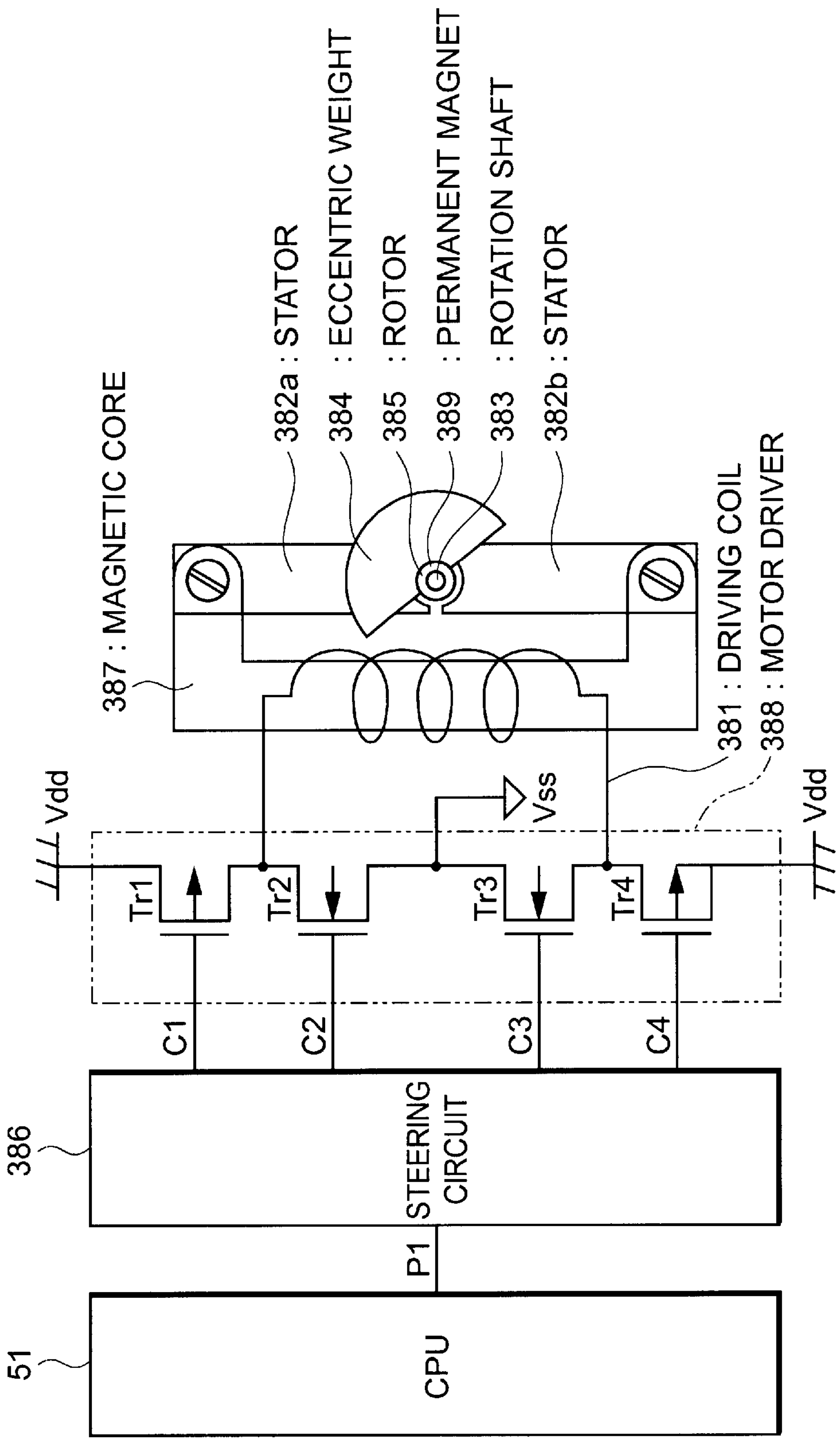
FIG. 12 is an explanatory diagram concerning a vibration generator.
Figure 13:
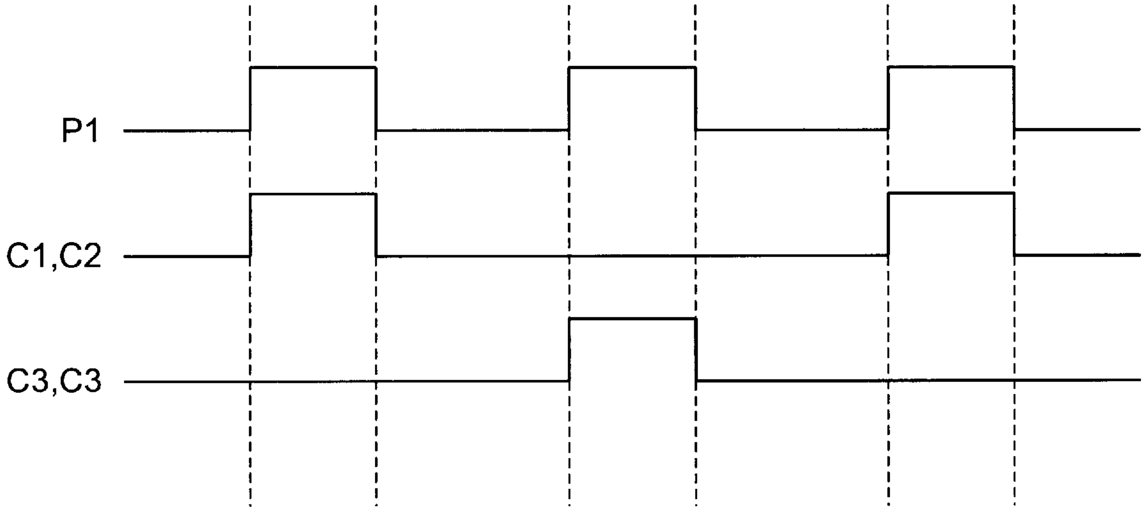
FIG. 13 is an explanatory diagram concerning the action of the vibration generator.

An eccentric weight 384 is fixed to a step motor like the one shown in FIG. 12. The step motor is rotated continuously in order to propagate vibrations. Thus, a vibration alarm is given.

The vibration alarm step motor is composed of a rotor 385, a stator 382*a,* a stator 382*b,* a magnetic core 387, and a single-phase driving coil 381.

A permanent magnet 389 and the eccentric weight 384 are coaxially fixed to the rotation shaft 382 of the rotor 385.

The permanent magnet 289 is made mainly of a rare earth material, for example, samarium cobalt. Preferably, the permanent magnet 289 is polarized to have at least two poles.

The eccentric weight 384 is preferably made of a heavy metal in order to improve the effect of vibrations for notification. For example, a gold alloy or a tungsten alloy is employed.

The rotor 385 is locked with two chips of stators 382*a* and 382*b*.

Figure 14:
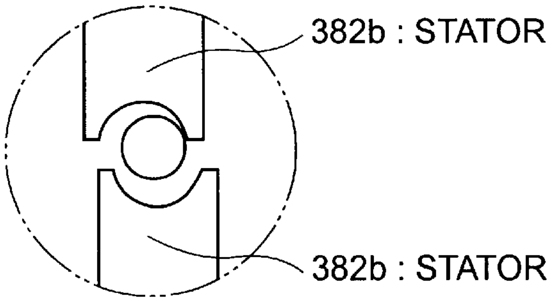
FIG. 14 is an explanatory diagram concerning a stator included in the vibration generator.

FIG. 14 is an enlarged view of the stators and their surroundings.

The two chips of stators 382*a* and 382*b* are eccentric and opposed to each other, and fixed to the magnetic core 387 with screws 380. Consequently, the stators and magnetic core constitute a magnetic circuit.

Furthermore, preferably, the stators 382*a* and 382*b* and magnetic core 387 are made of a material exhibiting a high magnetic permeability, for example, Permalloy in order to attain a high magnetic permeability. Moreover, a single-phase driving coil is formed with the magnetic core 387 as a core.

A driving circuit for the vibration alarm step motor is, as shown in FIG. 12, composed of the CPU 51, a steering circuit 386, and a driver circuit 388. The CPU 51 provides a driving pulse P1 and thus transmits a signal composed of the driving pulses to the steering circuit 386.

The driver circuit 388 consists of a PMOS transistor Tr1, a PMOS transistor Tr4, an NMOS transistor Tr2, and an NMOS transistor Tr3.

Among control signals C1 to C4 output from the steering circuit 386, the control signal C1 is applied to the gate of the PMOS transistor Tr1. The control signal C2 is fed to the NMOS transistor Tr2, and the control signal C3 is fed to the NMOS transistor Tr3. The control signal C4 is applied to the gate of the PMOS transistor Tr4.

One terminal of the driving coil 381 is connected to the drains of the PMOS transistor Tr1 and NMOS transistor Tr2. The other terminal of the driving coil 381 is connected to the drains of the NMOS transistor Tr3 and PMOS transistor Tr4.

Next, the actions of the vibration alarm generation circuit will be described with reference to FIG. 12 and FIG. 13.

During a period during which no driving pulse P1 is output from the CPU 51, the control signals C1 to C4 output from the steering circuit 386 are all low. The PMOS transistor Tr1 and PMOS transistor Tr4 are turned on. A high-voltage supply voltage Vdd is applied to the driving coil 381.

Thereafter, when the driving pulse P1 is output, a group of the control signals C1 and C2 output from the steering circuit 386 and the other group of the control signals C3 and C4 output therefrom are alternately driven high synchronously with the driving pulse P1.

Consequently, when the control signals C1 and C2 are driven high, the PMOS transistor Tr1 is turned off, the NMOS transistor Tr2 is turned on, the NMOS transistor Tr3 is turned off, and the PMOS transistor Tr4 is turned on.

Consequently, current flows from the high-voltage power supply Vdd through the PMOS transistor Tr4, driving coil 381, and NMOS transistor Tr2 to the low-voltage power supply Vss. The stators 382 are magnetized in a first direction, whereby the rotor 385 is rotated.

Thereafter, the next driving pulse P1 is output. In the steering circuit 386, the control signals C3 and C4 are driven high and the control signals C1 and C2 are driven low.

The PMOS transistor Tr1 is turned on, the NMOS transistor Tr2 is turned off, the NMOS transistor Tr3 is turned on, and the PMOS transistor Tr4 is turned off.

Consequently, current flows from the high-voltage power supply Vdd through the PMOS transistor Tr1, driving coil 381, and NMOS transistor Tr3 to the low-voltage power supply Vss. The stators 382 are magnetized in a second direction opposite to the first direction, whereby the rotor 385 is rotated.

Thereafter, the above actions are repeated for continuous operation. Violation of a specified pressure decrease ratio is informed.

[Description of the display unit]

Referring back to FIG. 1, the display surface of the liquid crystal display panel 11 is segmented into nine display fields. The nine display fields fall broadly into a display field 11A defined in the center of the display surface, and an annular display field 11B defined on the periphery of the display field 11A. In the present example, the display field 11A and the annular display field 11B defined outside the display field 11A have round shapes respectively. The shapes of the display fields 11A and 11B are not limited to the round shapes but may be elliptic shapes, track-like shapes, or polygonal shapes.

In the display field 11A, a first display field 111 defined near a position on the display surface comparable to the position of a mark of 12 on a wristwatch is the largest field among all the display fields. In the first display field 111, a current depth of water, a depth-of-water rank into which a depth of water is classified, and a date of diving (log number) are indicated in a diving mode, a surface mode (time instant mode), a planning mode, and a log mode respectively. A second display field 112 is defined adjacently to the first display field 111 near a position on the display surface comparable to the position of a mark of 3 on a wristwatch. In the second display field 111, a diving time, a current time instant, a non-decompression diving enabled time, and a diving start time instant (dive time instant) are indicated in the diving mode, surface mode (time instant mode), planning mode, and log mode respectively. A third display field 113 is defined below the first display field 111 near a position on the display surface comparable to the position of a mark of 6 on a wristwatch. In the third display field 113, a maximum depth of water, an intracorporeal nitrogen discharge time, a safety level, and a maximum depth of water (average depth of water) are indicated in the diving mode, surface mode (time instant mode), planning mode, and log mode respectively. A fourth display field 114 is defined adjacently to the third display field 113 near a position on the display surface comparable to the position of the mark of 3 on a wristwatch. In the fourth display field 114, a non-decompression diving enabled time, a surface pause time, a temperature, and a diving end time (maximum depth-time water temperature) are indicated in the diving mode, surface mode (time instant mode), planning mode, and log mode respectively. A fifth display field 115 is defined below the third display field 113 near a position on the display surface comparable to the side of the mark of 6 on a wristwatch. In the fifth display field 115, a power out warning 104 and an altitude rank 103 into which an altitude is classified are indicated. In a sixth display field 116 defined near the position on the display surface comparable to the position of the mark of 6 on a wristwatch, an amount of intracorporeal nitrogen is indicated graphically. A seventh display field 117 is defined adjacently to the sixth display field 116 near the position on the display surface comparable to the position of the mark of 3 on a wristwatch. The seventh display field 117 includes a sub-field in which whether nitrogen (inert gas) tends to be absorbed or discharged by a diver who is being decompressed is indicated in the diving mode. Moreover, the seventh display field 117 includes a sub-field in which "SLOW" is displayed, and a sub-field in which "DECO" is displayed. "SLOW" is one of pressure decrease ratio violation warning marks and indicates that a pressure decrease ratio is too high, and "DECO" is a warning mark indicating that a diver is being decompressed during diving. In an eighth display field 118 defined below the seventh display field 117 near the position on the display surface comparable to the position of the mark of 6 on a wristwatch, a pressure decrease ratio at which pressure changes during surfacing is graphically indicated in the diving mode.

[Description of a method of calculating an amount of intracorporeal nitrogen]

Figure 4:
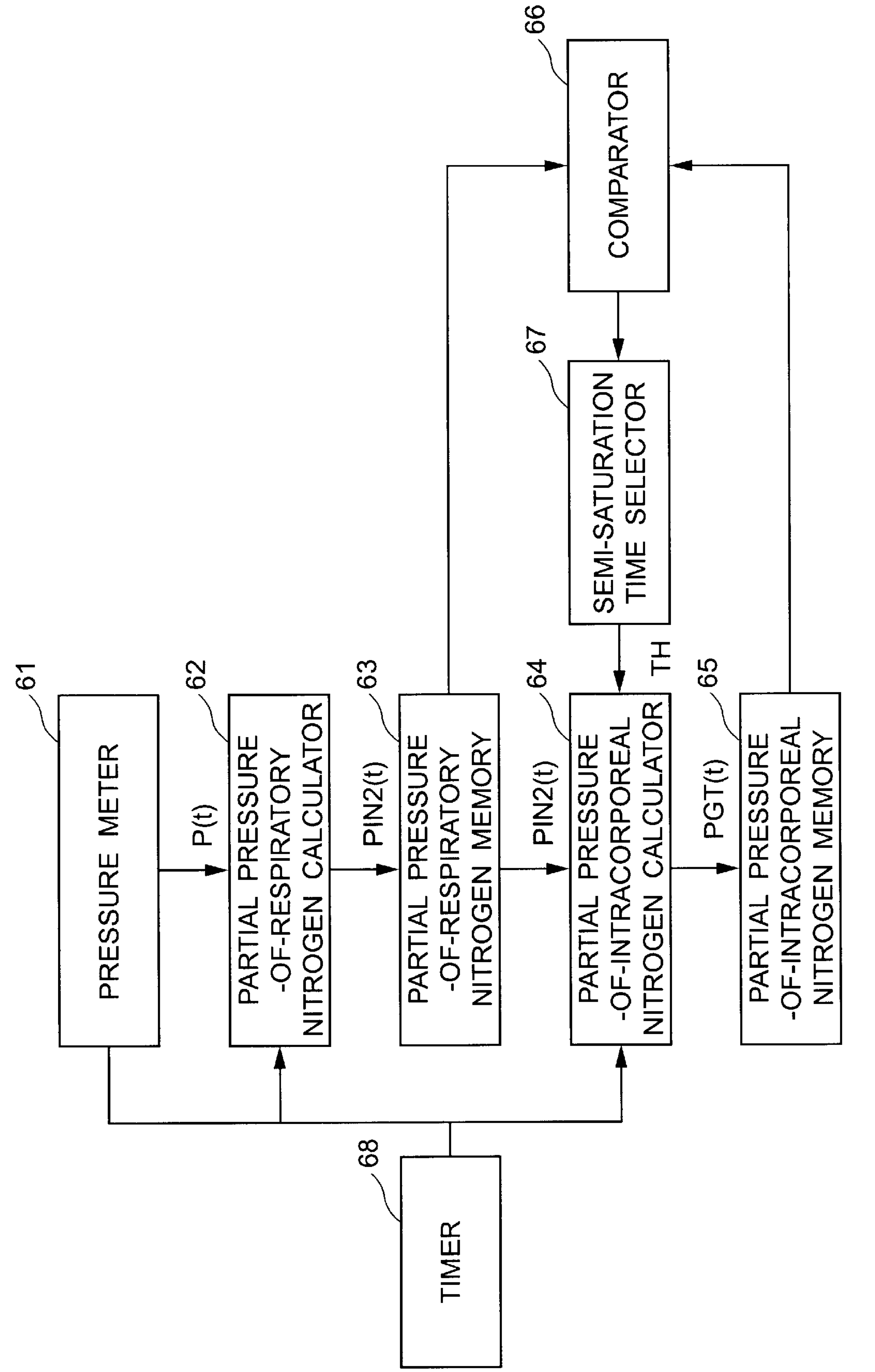
FIG. 4 is a block diagram showing components required for calculating an amount of intracorporeal nitrogen in the diver's information processing device to which the present invention is adapted.

FIG. 4 is a functional block diagram for explaining an example of a configuration for calculating a partial pressure of intracorporeal nitrogen (amount of intracorporeal inert gas) in the diver's information processing device 1 of the present example. The amount of intracorporeal nitrogen is adopted as an example of a condition for decompression to be calculated. Various methods of calculating other various parameters may be adopted. Now, a configuration for calculating the amount of intracorporeal nitrogen will be described briefly. A method of calculating a condition for decompression occurring during diving, which is employed in the diver's information processing device of the present example has been described in "Dive Computers—A Consumer's Guide to History, Theory & Performance" (Watersport Publishing Inc., 1991) written by Ken Loyst et al. Moreover, the theory of the method is detailed in "Decompression—Decompression Sickness" (Springer, Berlin, 1984) written by A. A. Buhlmann. Either of the literatures implies that inert gas having permeated into a body during diving invites decompression sickness. From a viewpoint of reliably averting decompression sickness, the calculation method described in "Decompression—Decompression Sickness" (Springer, Berlin, 1984, pp.14) written by A. A. Buhlmann has been discussed.

For calculating an amount of intracorporeal nitrogen in the form of a partial pressure, the diver's information processing device 1 of the present example includes facilities shown in FIG. 4. The facilities are the pressure meter 61, partial pressure-of-respiratory nitrogen calculator 62, partial pressure-of-respiratory nitrogen memory 63, partial pressure-of-intracorporeal nitrogen calculator 64, partial pressure-of-intracorporeal nitrogen memory 65, timer 68, comparator 66, and semi-saturation time selector 67. The pressure meter 61 measures a depth of water (hydraulic pressure) or an atmospheric pressure using the pressure sensor 34, amplifier circuit 35, and A/D converter circuit 36 which are shown in FIG. 2. The partial pressure-of-respiratory nitrogen calculator 62 is realized with the capabilities of the CPU 51, ROM 53, and RAM 54 shown in FIG. 2. The partial pressure-of-respiratory nitrogen memory 63 is realized with the RAM 54 shown in FIG. 2. The partial pressure-of-intracorporeal nitrogen calculator 64 is realized with the capabilities of the CPU 51, ROM 53, and RAM 54 shown in FIG. 2. The partial pressure-of-intracorporeal nitrogen memory 65 is realized with the RANI 54 shown in FIG. 2. The timer 68 is realized with the time instant counter 33 shown in FIG. 2. The comparator 66 is realized with the capabilities of the CPU 51, ROM 53, and RAM 54 shown in FIG. 2, and compares data stored in the partial pressure-of-respiratory nitrogen memory 63 with data stored in the partial pressure-of-intracorporeal nitrogen memory 65. The semi-saturation time selector 67 is realized with the capabilities of the CPU 51, ROM 53, and RAM 54 shown in FIG. 2. Among these components, the partial pressure-of-respiratory nitrogen calculator 62, partial pressure-of-intracorporeal nitrogen calculator 64, comparator 66, and semi-saturation selector 67 may be realized as software used in the CPU 51, ROM 53, and RAM 54 shown in FIG. 2. Alternatively, the partial pressure-of-respiratory nitrogen calculator 62, partial pressure-of-intracorporeal nitrogen calculator 64, comparator 66, and semi-saturation selector 67 may each be realized with only a logic circuit that is hardware, or a combination of a processing circuit, which includes a logic circuit and a CPU, and software.

Among the foregoing facilities, the pressure meter 61 calculates and outputs a hydraulic pressure P(t) that varies with a time t.

The partial pressure-of-respiratory nitrogen calculator 62 calculates and outputs a partial pressure of respiratory nitrogen $PIN_2(t)$ using the hydraulic pressure P(t) output from the pressure meter 61. The partial pressure of respiratory nitrogen $PIN_2(t)$ is calculated using the hydraulic pressure P(t), which is applied to a diver during diving, according to the expression below.

$$PIN_2(t)=0.79\times P[\text{bar}]$$

$PIN_2(t)$ calculated by the partial pressure-of-respiratory nitrogen calculator 62 according to the above expression is stored in the partial pressure-of-respiratory nitrogen memory 63.

The partial pressure-of-intracorporeal nitrogen calculator 64 calculates a partial pressure of intracorporeal nitrogen PGT(t) in each of tissues among which a nitrogen absorbing/discharging rate differs. Taking one tissue for instance, the partial pressure of intracorporeal nitrogen $PGT(t_E)$ to be absorbed or discharged during a period from a dive time instant $t=t_0$ to $t_E$ is stored as the partial pressure of intracorporeal nitrogen $PGT(t_E)$ in association with the time instant $t_0$ in the partial pressure-of-intracorporeal nitrogen memory 65. An expression giving $PGT(t_E)$ is as follows:

$$PGT(t_E)=PGT(t_0)+\{PIN_2(t_0)-PGT(t_0)\}\times\{1-\exp(-k(t_E-T_0)/T_H)\}$$

where k denotes a constant experimentally drawn out.

Thereafter, the comparator 66 compares $PIN_2(t)$, which is a result of calculation stored in the partial pressure-of-respiratory nitrogen memory 63, with PGT(t) that is a result of calculation stored in the partial pressure-of-intracorporeal nitrogen memory 65. Consequently, the semi-saturation time selector 67 varies a semi-saturation time $T_H$ employed by the partial pressure-of-intracorporeal nitrogen calculator 64.

For example, assuming that the partial pressure of respiratory nitrogen $PIN_2(t_0)$ associated with the time instant $t=t_0$ and the partial pressure of intracorporeal nitrogen $PGT(t_0)$ associated therewith are stored in the partial pressure-of-respiratory nitrogen memory 63 and partial pressure-of-intracorporeal nitrogen memory 65 respectively. The comparator 66 compares $PIN_2(t_0)$ with $PGT(t_0)$.

The partial pressure-of-intracorporeal nitrogen calculator 64 calculates the partial pressure of intracorporeal nitrogen $PGT(t_E)$ associated with a time instant $t=t_E$ while being controlled by the semi-saturation time selector 67 as follows:

When $PGT(t_0)>PIN_2(t_0)$, $$PGT(t_E)=PGT(t_0)+\{PIN_2(t_0)-PGT(t_0)\}\times\{1-\exp(-k(t_E-t_0)/T_{H1})\}$$

When $PGT(t_0)<PIN_2(t_0)$, $$PGT(t_E)=PGT(t_0)+\{PIN_2(t_0)-PGT(t_0)\}\times\{1-\exp(-k(t_E-t_0)/T_{H2})\}$$

where k denotes a constant and $T_{H2}$ is smaller than $T_{H1}$.

When $PGT(t_0)=PIN_2(t_0)$, the semi-saturation time TH is preferably set to equal $(T_{H2}+T_{H1})/2$. The time instants (or measurement of $t_0$ and $t_E$) are managed by the timer 68 shown in FIG. 3.

When $PGT(t_0)>PIN_2(t_0)$, nitrogen is discharged from a body. When $PGT(t_0)<PIN_2(t_0)$, nitrogen is absorbed into a body. The semi-saturation time varies between discharge and absorption. Namely, when nitrogen is discharged, the semi-saturation time is long and it takes much time to discharge nitrogen. When nitrogen is absorbed, the semi-saturation time is short and the time required for respiration is shorter than the time required for discharge. Thus, an amount of intracorporeal nitrogen can be more strictly simulated. Therefore, once the upper limit of an amount of intracorporeal nitrogen is set, a time during which diving can be performed without decompression or a time required after a diver surfaces until an amount of intracorporeal nitrogen returns to a normal level can be calculated based on a current amount of intracoiporeal nitrogen. If a diver is notified of these items of information, safety in diving can be improved.

[Description of the modes]

Figure 5:
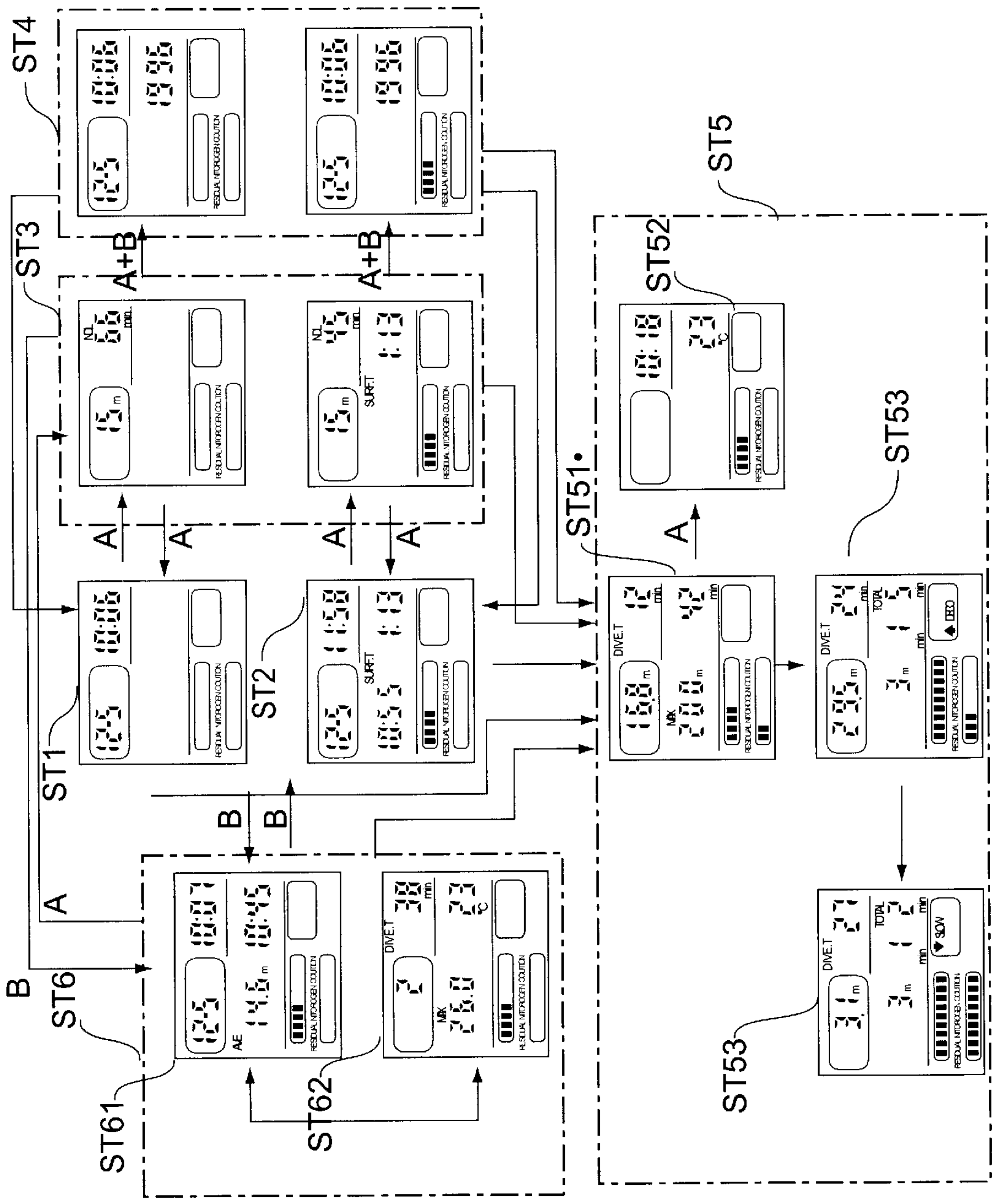
FIG. 5 is a flowchart showing facilities included in the diver's information processing device to which the present invention is adapted.

The thus configured information processing device 1 can be operated in the modes to be described below with reference to FIG. 5 (time instant mode ST1, surface mode ST2, planning mode ST3, setting mode ST4, diving mode ST5, and log mode ST6). FIG. 5 shows items to be indicated in the display field 11A alone out of all the display fields on the liquid crystal panel 11.

(Time instant mode)

The time instant mode ST1 is a mode in which the information processing device 1 is operated when the information processing device 1 is carried with a diver on the land with no switch manipulated and with intracorporeal nitrogen in equilibrium. A current date 100, a current time instant 101, and an altitude rank 102 into which an altitude is classified (see FIG. 1) (no mark is displayed when an altitude is classified into rank 0) are indicated on the liquid crystal panel 11. As for the altitude rank 102, the altitude of a current place is automatically measured and classified into any of three ranks. The current time instant 101 is indicated with a flickering colon. For example, when the liquid crystal display panel 11 is in the state shown in FIG. 5 and FIG. 6, it is ten past six on December 5th.

Moreover, when a diver travels to places that are high and low above sea level, an atmospheric pressure varies from place to place. Irrespective of whether the diver performed diving previously, nitrogen permeates into the diver's body or is discharged therefrom. In the information processing device 1 of the present example, even when the time instant mode ST1 has been established, if altitudes are changed as mentioned above, decompression-related calculation is automatically started. Indications are changed. Specifically, a time having elapsed since altitudes are changed, a time required until intracorporeal nitrogen reaches equilibrium, and an amount of nitrogen discharged or permeated from now on until nitrogen reaches equilibrium are indicated, through they are not shown in any drawing.

In the time instant mode ST1, when the switch A is pressed, the time instant mode ST1 is changed directly to the planning mode ST3. When the switch B is pressed, the time instant mode ST1 is changed directly to the log mode ST6. After the switch A is pressed, if the switch B is kept pressed for five seconds with the switch A held down, the time instant mode ST1 is changed to the setting mode ST4.

(Surface mode ST2)

In the information processing device 1, after diving is completed, when the diving action monitor switch 30 that have been conducting is isolated, the surface mode ST2 is automatically established. The surface mode ST2 is a mode adopted when the information processing device 1 is carried with a diver on the land until forty-eight hours have elapsed since a previous diving action. In the surface mode ST2, in addition to the data presented in the time instant mode ST1

Figure 6:
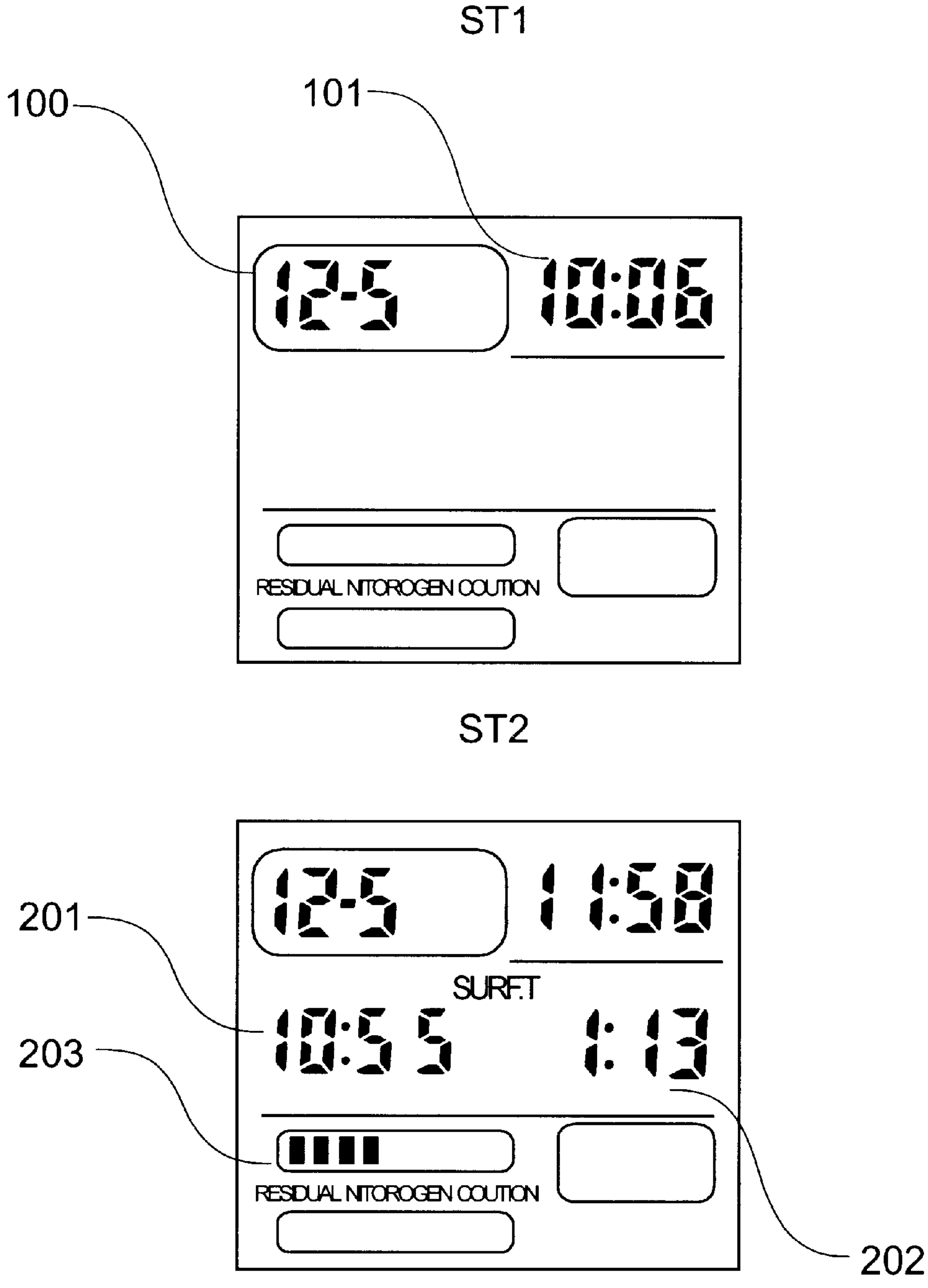
FIG. 6 includes explanatory diagrams concerning screen displays for a time mode and a surface mode respectively.

(current date 100, current time instant 101, and altitude rank), an estimated change in an amount of intracorporeal nitrogen occurring after completion of diving is indicated as shown in FIG. 6. Specifically, a time required until excess nitrogen having permeated into a body is discharged and intracorporeal nitrogen reaches equilibrium is indicated as an intracorporeal nitrogen discharge time 201. As the intracorporeal nitrogen discharge time 201, the time required until intracorporeal nitrogen reaches equilibrium is counted down. After the intracorporeal nitrogen discharge time 201 becomes zero hour and zero minutes, no indication is displayed. Moreover, a time having elapsed since completion of diving is indicated as a surface pause time 202. For indicating the surface pause time 202, timekeeping is started with a time instant, at which a depth of water indicated in the diving mode ST5 becomes smaller than 1.5 m, regarded as the end of diving. Timekeeping is continued for forty-eight hours. Thereafter, no indication is displayed. In the information processing device 1, the surface mode ST2 is established on the land until forty-eight hours elapses since completion of diving. Thereafter, the time instant mode ST1 is established. When the liquid crystal display panel 11 is in the state shown in FIG. 5, it is two to twelve on December 5th, and one hour and thirteen minutes has elapsed since completion of diving. Moreover, an amount of nitrogen having permeated into a body due to past diving is indicated with four marks displayed as an intracorporeal nitrogen graph 203. The time (intracorporeal nitrogen discharge time 201) required until excess nitrogen is discharged from a body and intracorporeal nitrogen reaches equilibrium is indicated as, for example, ten hours and fifty-five minutes.

When the switch A is pressed, the surface mode ST2 is changed directly to the planning mode ST3. When the switch B is pressed, the surface mode ST2 is changed directly to the log mode ST6. After the switch A is pressed, if the switch B is kept pressed for five seconds with the switch A held down, the surface mode ST2 is changed to the setting mode ST4.

(Planning mode ST3)

Figure 7:
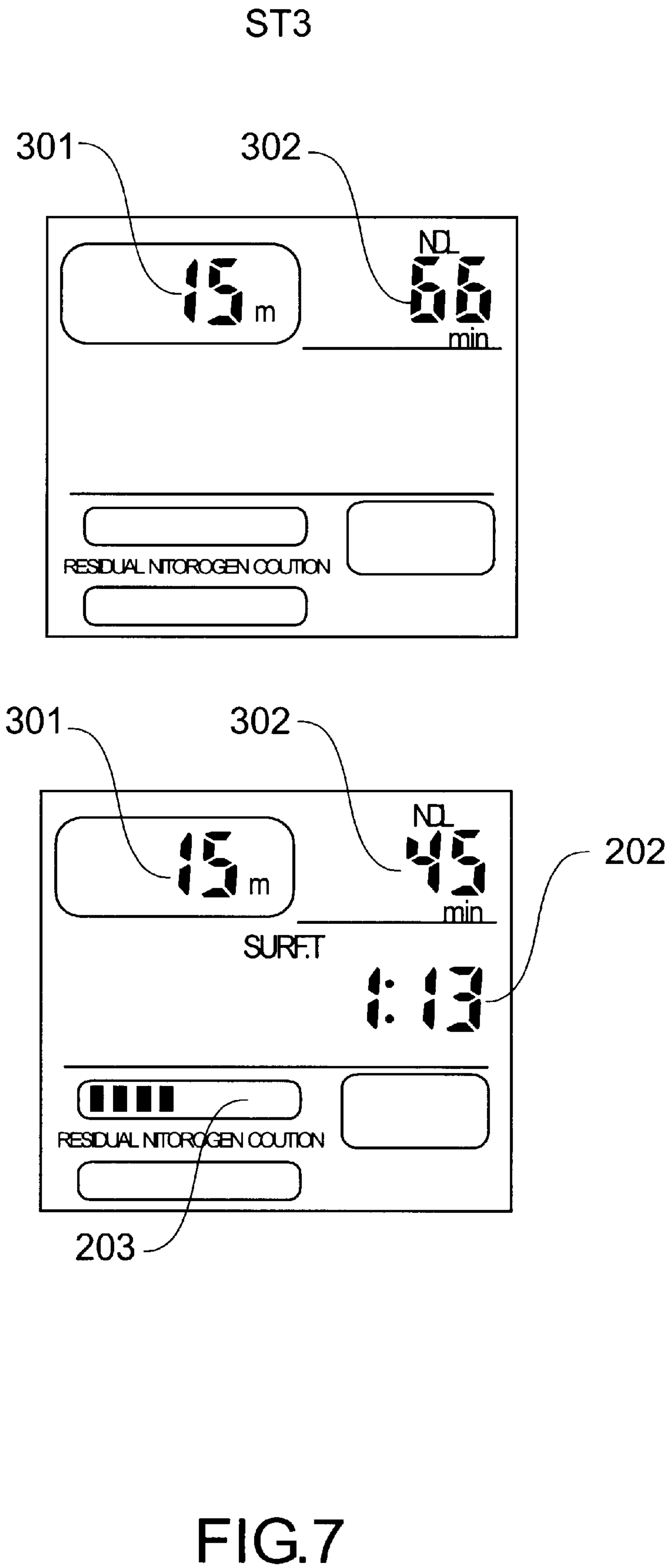
FIG. 7 includes explanatory diagrams concerning screen displays for a planning mode.
Figure 8:
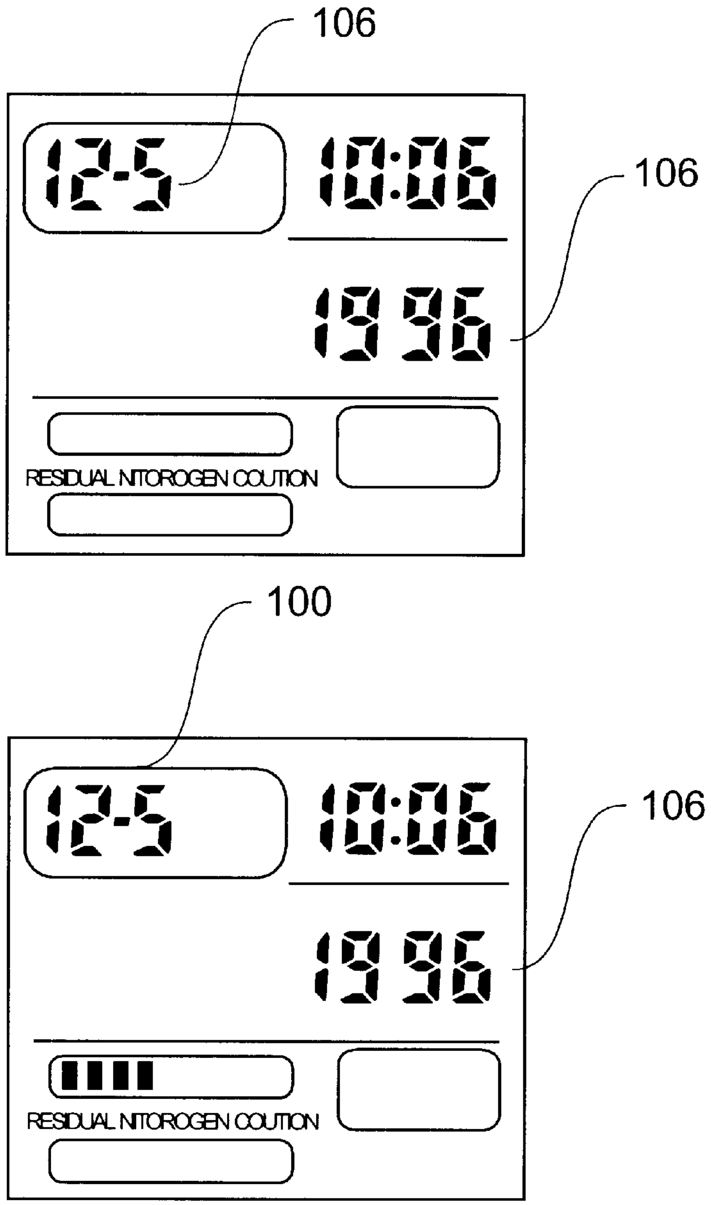
FIG. 8 includes explanatory diagrams concerning screen displays for a setting mode.

The planning mode ST3 is a mode in which an estimated maximum depth of water at which the next diving will be performed and an estimated diving time can be entered. In this mode, as shown in FIG. 7, the depth-of-water rank 301 into which a depth of water is classified, the non-decompression diving enabled time 302 during which diving can be performed without decompression, the safety level, the altitude rank, and the surface pause time 202 are indicated. Moreover, the intracorporeal nitrogen graph 203 is displayed. As the depth-of-water rank 301, an indication of a lower rank is sequentially changed to an indication of a higher rank. Indications displayed as the depth-of-water rank 301 are 9 m, 12 m, 15 m, 18 m, 21 m, 24 m, 27 m, 30 m, 33 m, 36 m, 39 m, 42 m, 45 m, and 48 m that are switched at intervals of 5 seconds. If the planning mode ST3 is established on behalf of the time instant mode ST1, initial diving is planned for a diver not having excess nitrogen accumulated in his/her body due to past diving. Therefore, the intracorporeal nitrogen graph 203 appears with no mark. When a depth of water is 15 m, the non-decompression diving enabled time 302 is indicated as sixty-six minutes. This signifies that diving can be performed without decompression at depths of water ranging from 12 m to 15 m during less than sixty-six minutes. In contrast, if the planning mode ST3 is established on behalf of the surface mode ST2, repeated diving is planned for a diver who has excess nitrogen accumulated in his/her body due to past diving. Consequently, the intracorporeal nitrogen graph 203 appears with four marks. When a maximum depth of water is 15 m, the non-decompression diving enabled time 302 is indicated as forty-nine minutes. This signifies that diving can be performed without decompression at depths of water ranging from 12 m to 15 m for less than forty-nine minutes.

When the switch A is held down for two seconds or more until the depth-of-water rank 301 is indicated as 48 m, the planning mode ST3 is changed directly to the surface mode ST2. After the depth-of-water rank 301 is indicated as 48 m, the planning mode ST3 is automatically changed to the time instant mode ST1 or surface mode ST2. If no switch is manipulated during a predetermined period, the planning mode ST3 is automatically changed to the surface mode ST2 or time instant mode ST1. This obviates the necessity of manipulating the switches for every change of the planning mode to another mode, and would be convenient. In contrast, when the switch B is pressed, the planning mode ST3 is changed directly to the log mode ST6.

(Setting mode ST4)

The setting mode ST4 is a mode for enabling, in addition to setting of the date 100 and current time instant 101, designation of whether warning alarms are turned on or off and setting of a safety level. In the setting mode ST4, the date 100, a year 106, the current time instant 101, the safety level (not shown), whether the alarms are turned on or off (not shown), and the altitude rank are indicated. Among these items, the safety level can be set to two levels, that is, a level at which normal decompression-related calculation is performed, and a level at which decompression-related calculation is performed on the assumption that a diver travels to a place, of which altitude belongs to an altitude rank higher by one rank, after completion of diving. Designation of whether the alarms are turned on or off is a designation of whether various warning alarms should be sounded using the acoustic notifier 37. If the alarms are set to be off, no alarm is sounded. In the diver's information processing device 1 to which a dead battery is fatal, power to be consumed by the alarms can be saved. This would be helpful.

In the setting mode ST4, every time the switch A is pressed, the set items of hours, seconds, minutes, a year, a month, a day, a safety level, and whether the alarms are turned on or off are changed in that order. An indication of each set item is flickered. At this time, when the switch B is pressed, numerals or characters displayed to indicate a set item are changed to another ones. When the switch B is held down, the numerals or characters are changed quickly. When an indication of whether the alarms are turned on or off is flickered, if the switch A is pressed, the setting mode is returned to the surface mode ST2 or time instant mode ST1. If neither the switch A nor switch B is pressed for one to two minutes, the setting mode is automatically returned to the surface mode ST2 or time instant mode ST1.

(Log mode ST6)

When the switch B is pressed, the time instant mode ST1 or surface mode ST2 is changed directly to the log mode ST6. The log mode ST6 is a mode in which various kinds of data are stored and presented when a diver dives deeper than a depth of water of 1.5 m with the diving mode ST5 retained for three minutes or more. These kinds of diving data are successively stored as log data in association with each diving. Up to ten log data sets are stored and preserved. If diving is performed more than ten times, old data is deleted in order of length of time for which data is stored. Ten latest diving actions are always stored.

In the log mode ST6, log data is presented using two screen displays that are switched at intervals of four seconds.

Figure 10:
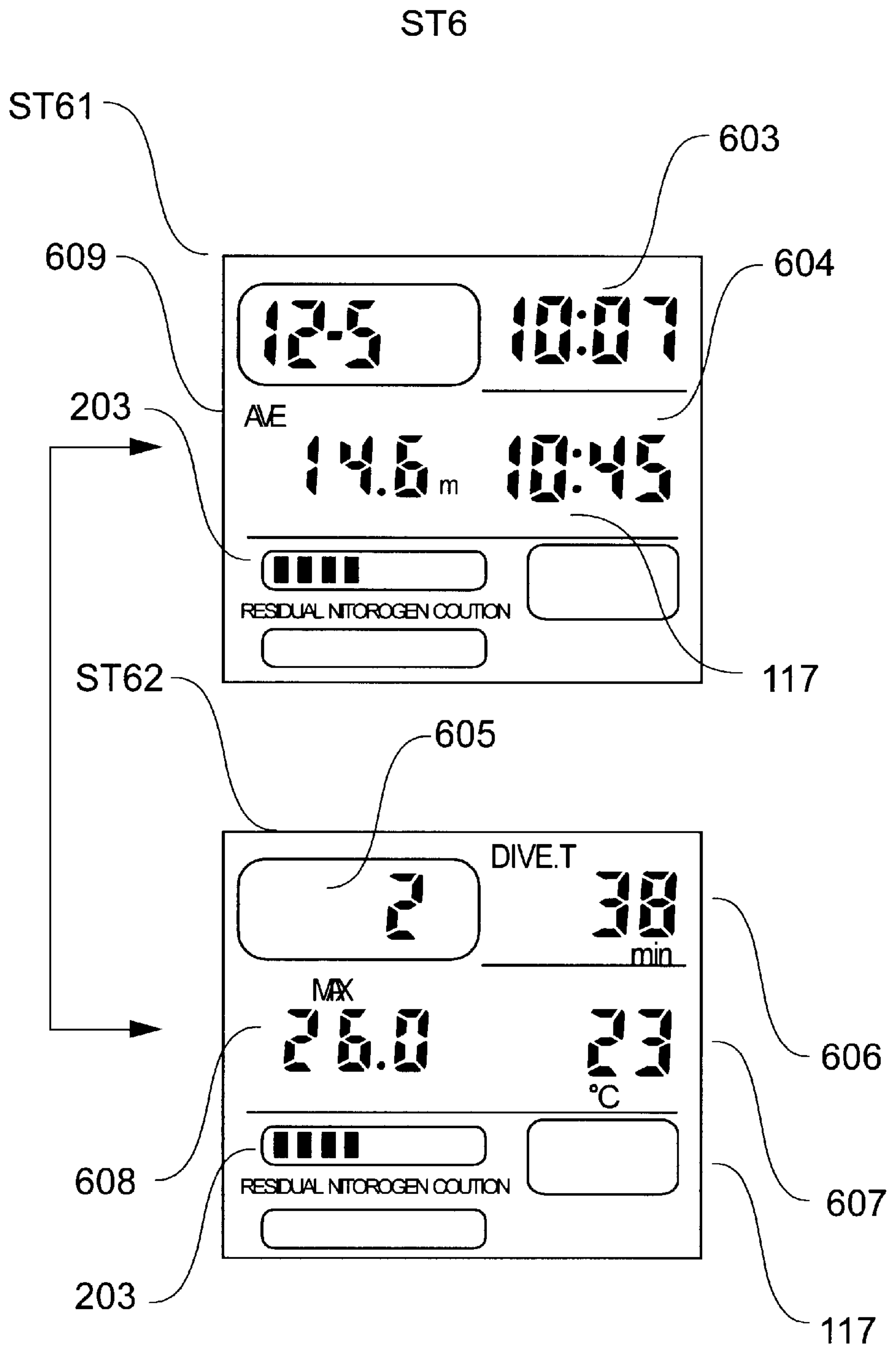
FIG. 10 includes explanatory diagrams concerning screen displays for a log mode.

As shown in FIG. 10, indicated in a first screen display ST61 are a date of diving 601, an average depth of water 509, a diving start time instant 603, a diving end time instant 604, the altitude rank, and the intracorporeal nitrogen graph 203 indicating an amount of intracorporeal nitrogen detected at the end of diving. Indicated in a second screen display ST62 are a log number 605 corresponding to a diving number assigned to a diving action performed on that data, a maximum depth of water 608, a diving time 606, a water temperature at the maximum depth of water 607, the altitude rank, and the intracorporeal nitrogen graph 203 indicating an amount of intracorporeal nitrogen detected at the end of diving. For example, when the liquid crystal display panel 11 is in the state of the display panel shown in FIG. 10, a second diving action was started at ten past seven on December 5th at an altitude classified into altitude rank 0. The diving action was completed at quarter to eleven and lasted for thirty-eight min. In this diving, the average depth of water was 14.6 m, the maximum depth of water was 26.0 m, and the water temperature at the maximum depth of water was 23° C. The intracorporeal nitrogen graph 203 appears with four marks, thus indicating that an amount of nitrogen associated with four marks has permeated into the diver's body. As mentioned above, in the log mode ST6, while two screen displays are automatically switched, various kinds of information are presented. Although the display surface of the display panel is limited, a large amount of information can be presented.

In the log mode ST6, if a speed violation warning is given two or more times during diving whose data is being presented, the fact is indicated with "SLOW" displayed in the seventh display field 117 on the liquid crystal display panel 11.

In the log mode ST6, every time the switch B is pressed, new data is switched to old data. After the oldest data is presented, the log mode ST6 is changed to the time instant mode ST1 or surface mode ST2. Meanwhile, if the switch B is held down for two or more seconds, the log mode ST6 is changed to the time instant mode ST1 or surface mode ST2. Furthermore, when neither the switch A nor B is pressed for one to two minutes, the log mode ST6 is automatically returned to the surface mode ST2 or time instant mode ST1. This obviates the necessity of manipulating the switches for every change of the log mode to the surface or time instant mode, and would be convenient. In contrast, when the switch A is pressed, the log mode ST6 is changed directly to the planning mode ST3.

(Diving mode ST5)

Figure 9:
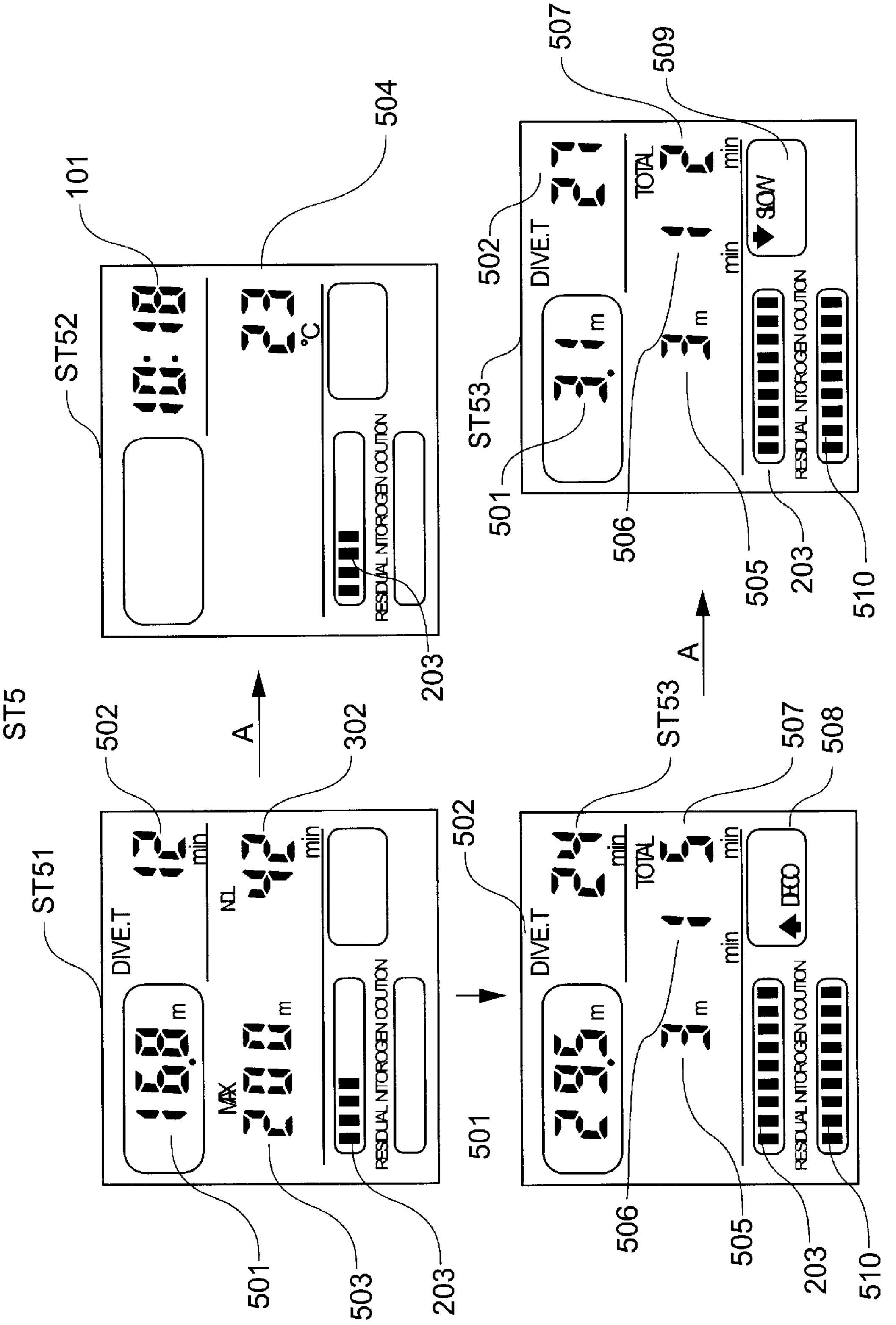
FIG. 9 includes explanatory diagrams concerning screen displays for a diving mode.

The diving mode ST5 is a mode selected for diving. A non-decompression diving mode ST51 is a mode adopted in order to present information necessary for diving shown in FIG. 9. Namely, a current depth of water 501, a diving time 502, a maximum depth of water 503, the non-decompression diving enabled time 302, the intracorporeal nitrogen graph 203, and the altitude rank are indicated in the diving mode ST5. For example, when the liquid crystal display panel 11 is in the state shown in FIG. 5, twelve minutes has elapsed since the start of diving, the depth of water is 16.8 m, and a diver can continue diving without decompression for more forty-two minutes at this depth of water. Moreover, the maximum depth of water having been attained so far is 20.0 m, and a current amount of intracorporeal nitrogen is of a level indicated with four marks displayed as the intracorporeal nitrogen graph 203.

As mentioned above, rapid surfacing causes decompression sickness or excess pulmonary expansion. Therefore, in the diving mode ST5, the pressure decrease ratio calculating unit 751 serving as a pressure decrease ratio monitoring facility calculates a current pressure decrease ratio. The pressure decrease ratio notifying unit 771 tells the pressure decrease ratio to a diver in such a manner that the diver can recognize the pressure decrease ratio.

The pressure decrease ratio is expressed by formula (1) as follows:

$$\text{Pressure decrease ratio}=(P(t)-P(\mathbf{0}))/t \tag{1}$$

where P(0) denotes a current pressure, P(t) denotes a pressure detected t seconds (min) earlier, and t denotes a time required for the pressures to be changed.

The pressures in formula (1) are each an absolute pressure that is the sum of an atmospheric pressure and a hydraulic pressure. As shown in FIG. 3, the pressure meter 61 may be used to directly acquire the information of an atmospheric pressure on water. Otherwise, information of an atmospheric pressure is entered using the operation unit 5. After the information of the atmospheric pressure on water is acquired, the upper limit-of-pressure decrease ratio setting unit 76 selects and sets the upper limit of a pressure decrease ratio according to the atmospheric pressure. A pressure change rate of a current pressure per unit time may be used to set the upper limit of a pressure decrease ratio. In this case, the step of setting the upper limit of a pressure decrease ratio in association with each atmospheric pressure can be omitted. This results in simplified processing. The pressure change rate is expressed as follows:

$$\text{Pressure change rate}=P(t)/P(\mathbf{0}) \tag{2}$$

where P(t) denotes a pressure predicted in t seconds (min), and P(0) denotes a current pressure. For example, the pressure change rate per min is set to a value that is not equal to or smaller than 0.5. The upper limit of a pressure decrease ratio can be set to a value, which will not be equal to a half of the current pressure P(0) within one minute, irrespective of information of an atmospheric pressure or a depth of water. When it says that the pressure should not be halved, it means that the air in a body should not be expanded to be a double.

It is important to prevent rapid surfacing during diving. In reality, once the upper limit of a pressure decrease ratio that represents a pressure decrease ratio of a dangerous level is exceeded, it may be too late. For inferring a pressure decrease ratio in t seconds (minutes), the following expression is employed:

$$dP(t)=dP(\mathbf{0})+(dP(\mathbf{0}-dP(t'))/t'\times t$$

where dP(t) denotes a pressure decrease ratio in t seconds (minutes), dP(0) denotes a current pressure decrease ratio, and dP(t') denotes a pressure decrease ratio detected t' seconds (minutes) earlier. Consequently, the pressure decrease ratio in t seconds (minutes) can be inferred. The expression may be modified so that a time that elapses until the upper limit of a pressure decrease ratio is exceeded can be calculated based on a change rate of the current pressure decrease ratio. The modified expression is as follows:

$$t=(dP\max-dP(\mathbf{0}))\times t'/(dP(\mathbf{0})-dP(t'))$$

where dPmax denotes the upper limit of a pressure decrease ratio, dP(0) denotes a current pressure decrease ratio, and dP(t') denotes a pressure decrease ratio detected t' seconds (minutes) earlier.

Moreover, the National Association of Underwater Instructors (NAUI) that is one of divers societies recommends that a surfacing speed should not exceed 18 m per min. For further safety, they recommend that a diver should surface at a speed not exceeding 10 m per min. Taking the surfacing speed for instance, when diving is performed at a high altitude of 3200 m, an atmospheric pressure on water is calculated as follows:

$$P(\mathbf{0})=10\times\exp(-H/8000)$$

where P(0) denotes the atmospheric pressure on water, and H denotes the altitude of the surface of water. Now, when 3200 is assigned to H, the atmospheric pressure on water is calculated as 6.7 msw. When diving is performed at 0 m above sea level, the atmospheric pressure on water is 10 msw. The atmospheric pressure at the high altitude of 3200 m is therefore lower by about 3.3 mws. Herein, msw is adopted as a unit of pressure. In diving, a distance in seawater in meters is often adopted as a standard unit of pressure.

Assuming that diving is performed at 0 m above sea level, if a diver surfaces from a depth of water of 10 m to the surface of water for one minute, the pressure decrease ratio is calculated as (20–10)/1=10 mws/min according to formula (1). The pressure change rate is calculated as 10/(10+10)=0.5 according to formula (2). On the other hand, assuming that a diver surfaces at a height of 3200 mm above sea level with a pressure change rate set to 0.5, the diver surfaces from a depth of water of 6.7 m (pressure is 13.4 msw) to the surface of water (pressure is 6.7 msw) for one minute. In other words, the upper limit of a pressure decrease ratio per minute at 0 m above sea level is 10 m, and the upper limit at the height of 3200 m above sea level is 6.7 m that is a critical value. The heights above sea level of diving spots are classified into groups that have an equal range. The upper limits of a power decrease ratio associated with the groups are listed below.

| Height above sea level | Upper limit of a pressure decrease ratio |
|---|---|
| 0 m | 10.0 msw/min |
| 0 to 800 m | 9.05 msw/min |
| 800 to 1600 m | 8.19 msw/min |
| 1600 to 2400 m | 7.41 msw/min |
| 2400 to 3200 m | 6.70 msw/min |

Based on information of an atmospheric pressure measured by the pressure meter 61 or entered at the operation unit 5, the upper limit-of-pressure decrease ratio setting unit 76 determines the upper limit of a pressure decrease ratio.

For warning a diver not to exceed the upper limit of a pressure decrease ratio, the frequency of an alarm sound may be varied or the alarm sound may be combined with a vibratory alarm. An example of a setting for diving to be performed at high altitudes ranging from 2400 to 3200 m is presented below.

| Pressure decrease ratio (msw/min) | Frequency of an alarm sound (Hz) |
|---|---|
| 4.7 to 5.7 | 500 |
| 5.7 to 6.7 | 1000 |
| 6.7 to 7.7 | 1500 (vibratory alarm is turned on) |
| 7.7 to 9.7 | 2000 |
| 9.7 to | 4000 |

In the present example, the upper limit of a pressure decrease ratio is defined based on an atmospheric pressure. Alternatively, the upper limit may be defined based on the atmospheric pressure and a depth of water, and the upper limit may be determined in association with each atmospheric pressure and each depth of water. Moreover, when the number of conditions for setting increases, processing become complex. Therefore, a pressure change rate may be determined, and the upper limit of a pressure decrease ratio may be determined based on the pressure change rate. This obviates the necessity of pre-setting the upper limits of a pressure decrease ratio in association with atmospheric pressures on water and depths of water. Processing thus can be simplified.

Moreover, a change in a pressure decrease ratio is communicated to a diver by displaying an indication, and the pressure decrease ratio is indicated on the display unit 118 shown in FIG. 1. If a plurality of divers uses the same diver's information processing devices, when they surface in the same manner, the plurality of diver's information processing devices may generate a sound. Even in this case, the divers are prevented from being at a loss.

In the diving mode ST5, when the switch A is pressed, a current time instant indication mode ST52 is established, and the current time instant 101 and current water temperature 504 are indicated while the switch A is held down. When the liquid crystal display panel 11 is in the state shown in FIG. 9, it is eighteen past ten and the water temperature is 23° C. Thus, when the switch is manipulated in the diving mode ST5, the current time instant 101 and current water temperature are indicated for a predetermined period of time. Even when only data necessary for diving is normally presented in the limited display surface of the liquid crystal display panel (non-decompression diving mode ST51), the current time instant 101 and others can be indicated if necessary (current time instant indication mode ST52). This would be convenient. Even in the diving mode ST5, the switch is used to change indications. Information a diver wants to know can be presented at a proper timing.

If a diver surfaces to a spot shallower than 1.5 m in the diving mode ST5, it is judged that diving is completed. As soon as the diving action monitor switch 30 that has been conducting is isolated, the diving mode ST5 is automatically changed to the surface mode ST2. Meanwhile, the results-of-diving recording unit 78 records and preserves in the RAM 54, the results of diving (a date of diving, a diving time, a maximum depth of water, and other various data items). At this time, one diving action is regarded to start when a depth of water becomes 1.5 m or more and end when the depth of water becomes less than 1.5 m. If pressure decrease ratio violation warning is given two or more consecutive times during diving, the fact is also recorded as a result of diving.

The information processing device 1 of the present example is designed on the assumption that diving is performed without decompression. If decompression becomes necessary during diving, the fact is notified a diver using an alarm sound. Besides, a decompression diving indication mode ST53 described below is established. Specifically, in the decompression diving indication mode ST53, the current depth of water 501, the diving time 502, the intracorporeal nitrogen graph 203, the altitude rank, a decompression pause depth 505, a decompression pause time 506, and a total surfacing time 507 are indicated. When the liquid crystal display panel 11 is in the state shown in FIG. 9, twenty-four minutes has elapsed since the start of diving and the depth of water is 29.5 m. Moreover, it is indicated that since an amount of intracorporeal nitrogen exceeds a permissible maximum value, a diver is in danger, should therefore surface to a depth of water of 3 m while observing a specified pressure decrease ratio of a safe level, and should pause for one minute for decompression. Moreover, an instruction that the diver should take at least five minutes to come up to the surface is presented as the specified pressure decrease ratio of a safe level. Furthermore, the fact that the amount of intracorporeal nitrogen tends to increase is indicated with an upward arrow. Based on the above contents of screen display, the diver surfaces after pausing for decompression. While decompression is under way, the fact that the amount of intracorporeal nitrogen tends to decrease is indicated with a downward arrow 509.

Industrial Applicability

According to the present invention, a diver's information processing device has means for checking a current pressure decrease ratio, giving a warning, and inferring a pressure decrease ratio for preventing the current pressure decrease ratio from being at a dangerous level during diver's surfacing. When a diver enjoys diving at a high altitude, although the diver surfaces at the same speed as he/she does during diving at a low altitude, a pressure change rate becomes large. Nevertheless, the risk of the diver's decompression sickness or excess pulmonary expansion during diving at the high altitude can be minimized.

What is claimed is:

1. A diver's information processing device, comprising:

pressure metering means;

diving time measuring means for measuring a diving time;

pressure decrease ratio calculating means for calculating a pressure decrease ratio, indicative of the rate at which pressure decreases during surfacing, according to the diving time measured by the diving time measuring means;

upper limit-of-pressure decrease ratio setting means for setting a pressure-decrease-ratio upper limit; and pressure decrease ratio comparing means for comparing the pressure-decrease-ratio upper limit with a current pressure decrease ratio calculated by the pressure decrease ratio calculating means;

wherein the upper limit-of-pressure decrease ratio setting means sets the pressure-decrease-ratio upper limit, based on an atmospheric pressure on the surface of the water in which diving is performed, as measured by the pressure metering means.

2. A diver's information processing device according to claim 1, further comprising a pressure decrease ratio notifying means for providing notification of a current pressure decrease ratio, or for giving a warning if it is determined that the current pressure decrease ratio exceeds the pressure-decrease-ratio upper limit.

3. A diver's information processing device according to claim 1, further comprising an upper limit-of-pressure decrease ratio indicating means for indicating a tolerance to the pressure-decrease-ratio upper limit.

4. A diver's information processing device according to claim 1, wherein a surfacing speed is determined from a calculated or inferred pressure decrease ratio.

5. A diver's information processing device according to claim 1, further comprising a pressure decrease ratio inferring means for calculating a difference between a previously-calculated pressure decrease ratio and the current pressure decrease ratio, determining from the calculated difference a pressure decrease ratio change rate, and inferring a future pressure decrease ratio from the determined pressure decrease ratio change rate.

6. A diver's information processing device according to claim 5, further comprising a pressure decrease ratio notifying means for providing notification of a current pressure decrease ratio, or for giving a warning if it is determined that the current pressure decrease ratio exceeds the pressure-decrease-ratio upper limit.

7. A diver's information processing device according to claim 1, wherein the upper limit-of-pressure decrease ratio setting means sets the pressure-decrease-ratio upper limit, based on the pressure measured by the pressure metering means and a pre-set pressure change rate.

8. A diver's information processing device according to claim 7, further comprising a pressure decrease ratio notifying means for providing notification of a current pressure decrease ratio, or for giving a warning if it is determined that the current pressure decrease ratio exceeds the pressure-decrease-ratio upper limit.

9. A diver's information processing device, comprising:

a pressure meter;

a timer that measures a diving time;

a pressure decrease ratio calculating unit, in communication with the pressure meter and the timer, that calculates a pressure decrease ratio, indicative of the rate at which pressure decreases during surfacing, according to signals received from the pressure meter and the timer;

a setting unit, in communication with the pressure meter, that sets a pressure-decrease-ratio upper limit; and a comparing unit, in communication with the pressure decrease ratio calculating unit and the setting unit, that compares the pressure-decrease-ratio upper limit with a current pressure decrease ratio calculated by the pressure decrease ratio calculating unit;

wherein the setting unit sets the pressure-decrease-ratio upper limit, based on an atmospheric pressure on the surface of the water in which diving is performed, as measured by the pressure meter.

10. A diver's information processing device according to claim 9, further comprising a pressure decrease ratio notifying unit that provides notification of a current pressure decrease ratio, or for giving a warning if it is determined that the current pressure decrease ratio exceeds the pressure-decrease-ratio upper limit.

11. A diver's information processing device according to claim 9, further comprising an upper limit-of-pressure decrease ratio indicating unit that indicates a tolerance to the pressure-decrease-ratio upper limit.

12. A diver's information processing device according to claim 9, wherein a surfacing speed is determined from a calculated or inferred pressure decrease ratio.

13. A diver's information processing device according to claim 1, wherein the pressure metering means comprises a single pressure meter that measures both water depth and atmospheric pressure.

14. A diver's information processing device according to claim 9, wherein the pressure meter comprises a single pressure meter that measures both water depth and atmospheric pressure.

15. A diver's information processing device according to claim 9, further comprising a pressure decrease ratio inferring unit, in communication with the pressure decrease ratio calculating unit, that calculates a difference between a previously-calculated pressure decrease ratio and the current pressure decrease ratio, determines from the calculated difference a pressure decrease ratio change rate, and infers a future pressure decrease ratio from the determined pressure decrease ratio change rate.

16. A diver's information processing device according to claim 15, further comprising a pressure decrease ratio notifying unit that provides notification of a current pressure decrease ratio, or for giving a warning if it is determined that the current pressure decrease ratio exceeds the pressure-decrease-ratio upper limit.

17. A diver's information processing device according to claim 9, wherein the setting unit sets the pressure-decrease-ratio upper limit, based on the pressure measured by the pressure meter and a pre-set pressure change rate.

18. A diver's information processing device according to claim 17, further comprising a pressure decrease ratio notifying unit that provides notification of a current pressure decrease ratio, or for giving a warning if it is determined that the current pressure decrease ratio exceeds the pressure-decrease-ratio upper limit.

* * * * *